May 23, 1950 — L. J. LUNAS — 2,508,410
MOVING COIL MEASURING INSTRUMENT
Filed Dec. 27, 1944 — 4 Sheets-Sheet 1
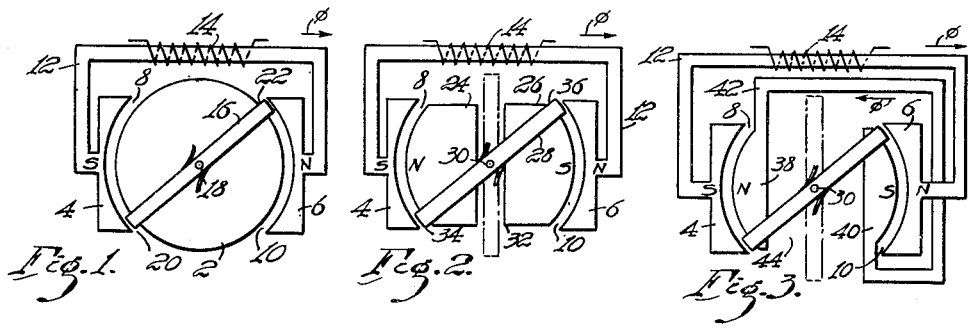
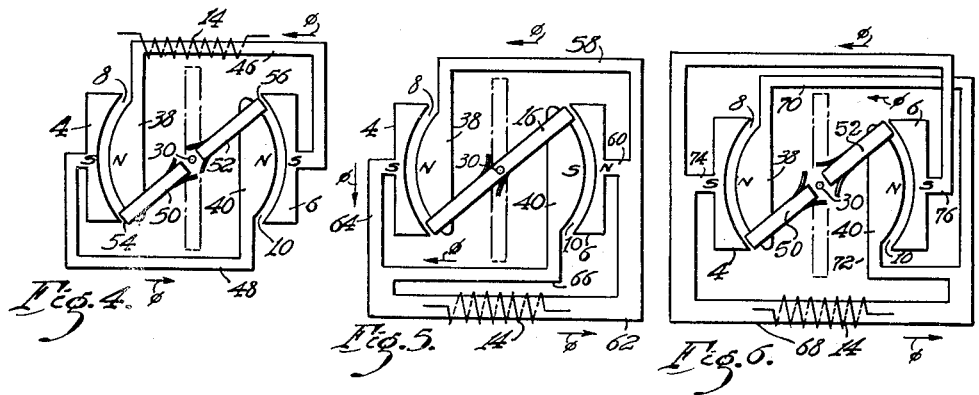
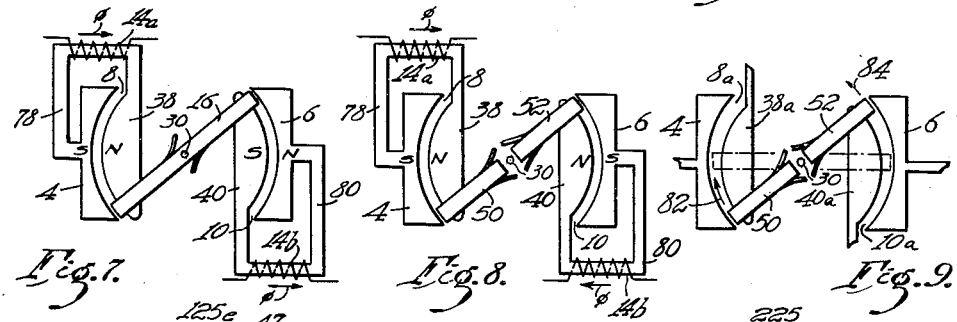
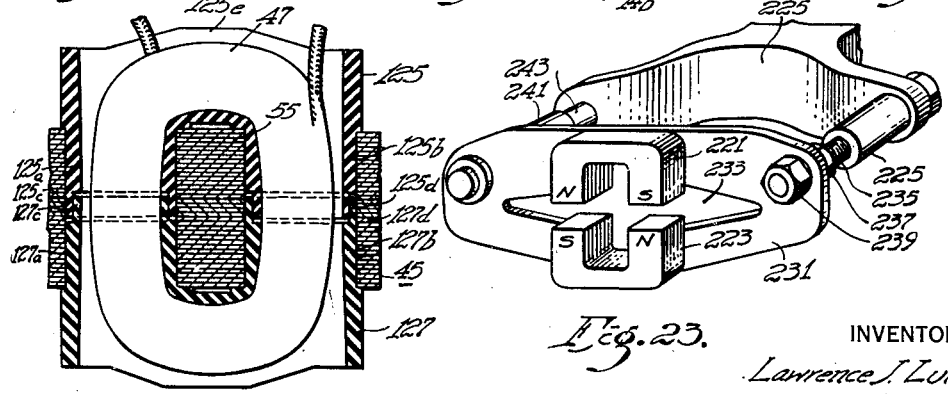
INVENTOR
Lawrence J. Lunas,
BY C. L. Friedman
ATTORNEY May 23, 1950 L. J. LUNAS 2,508,410
MOVING COIL MEASURING INSTRUMENT
Filed Dec. 27, 1944 4 Sheets-Sheet 2
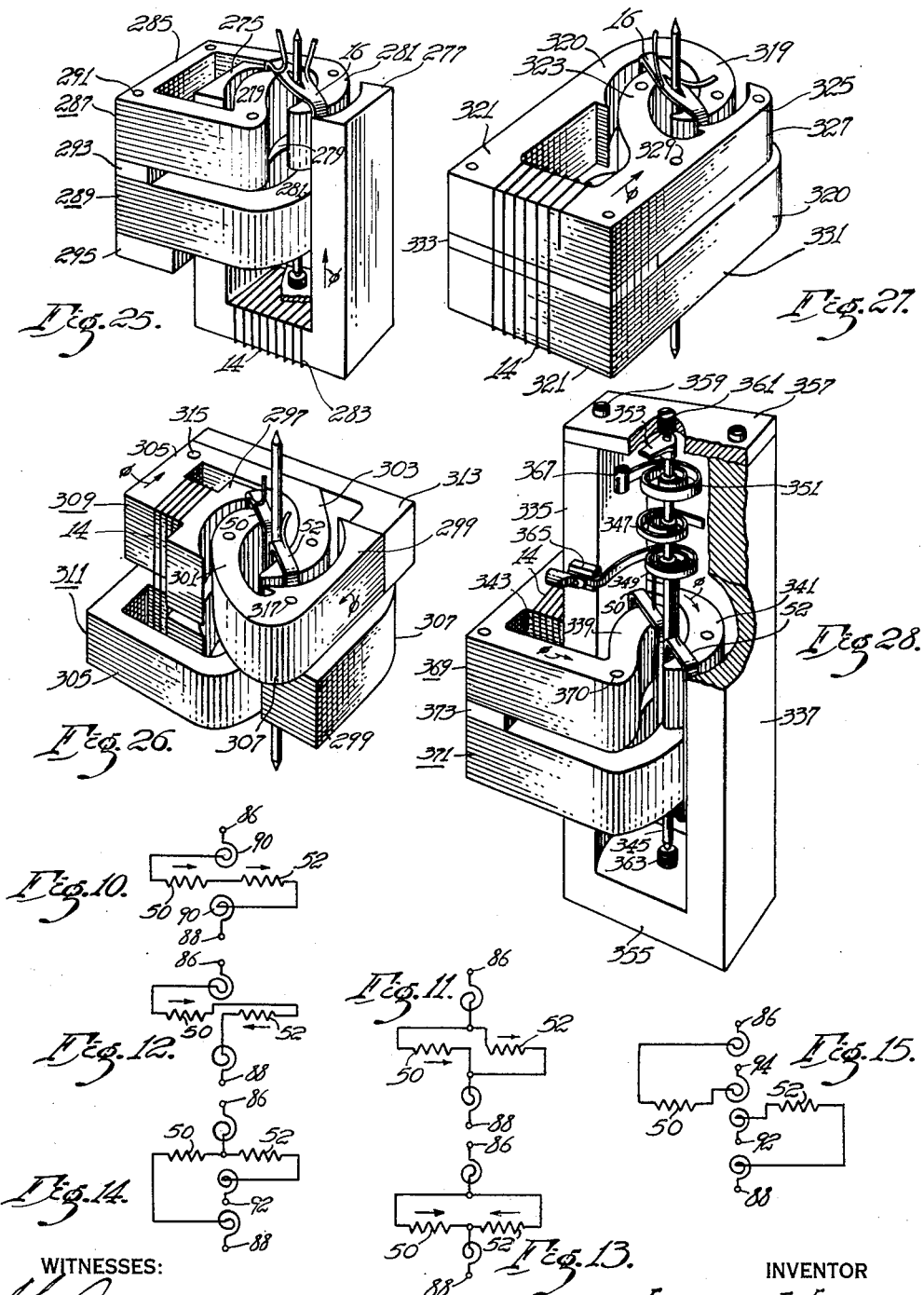
WITNESSES:
INVENTOR
Lawrence J. Lunas.
BY
ATTORNEY May 23, 1950          L. J. LUNAS          2,508,410
MOVING COIL MEASURING INSTRUMENT
Filed Dec. 27, 1944          4 Sheets-Sheet 3
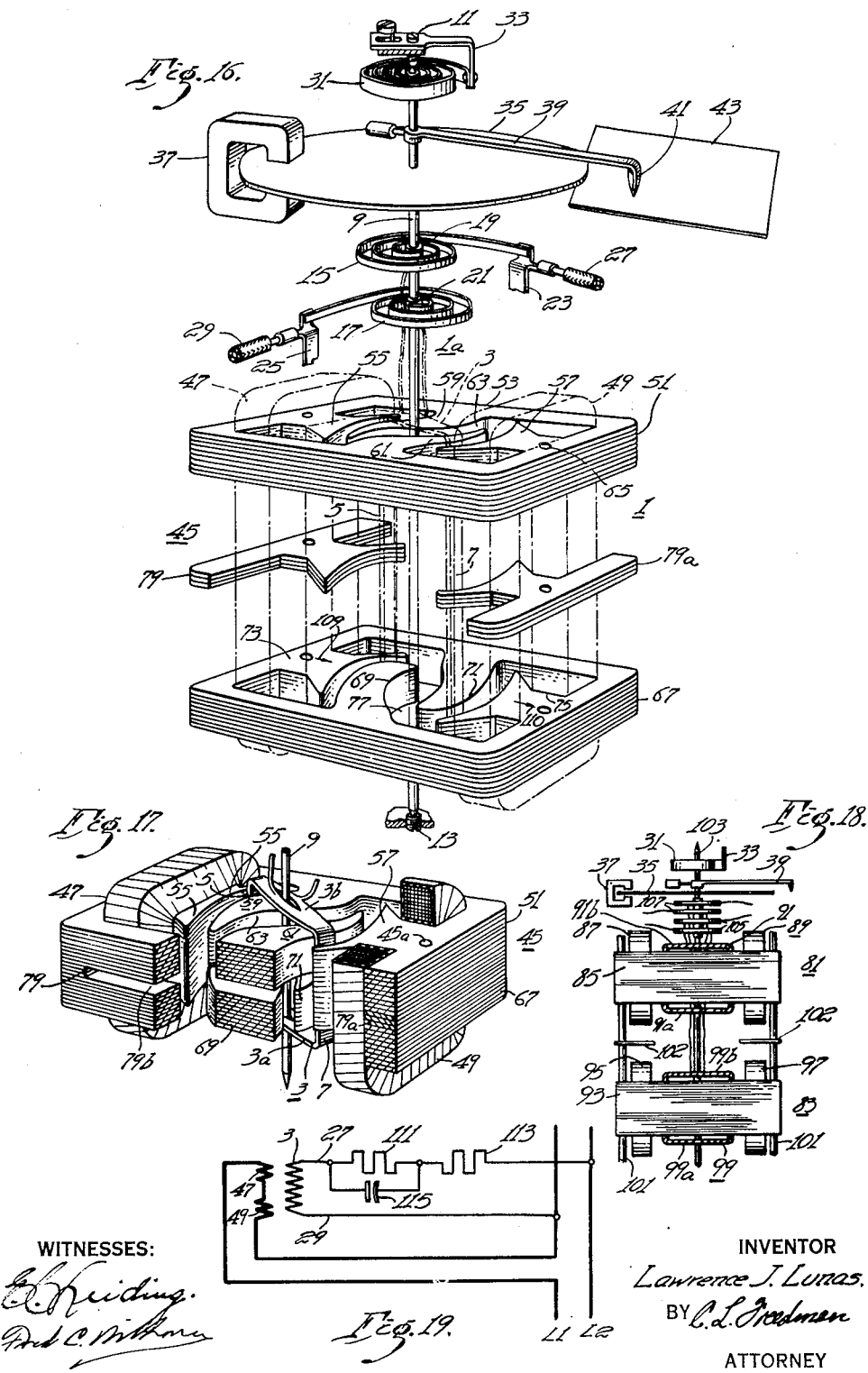
WITNESSES:
INVENTOR
Lawrence J. Lunas.
BY
ATTORNEY

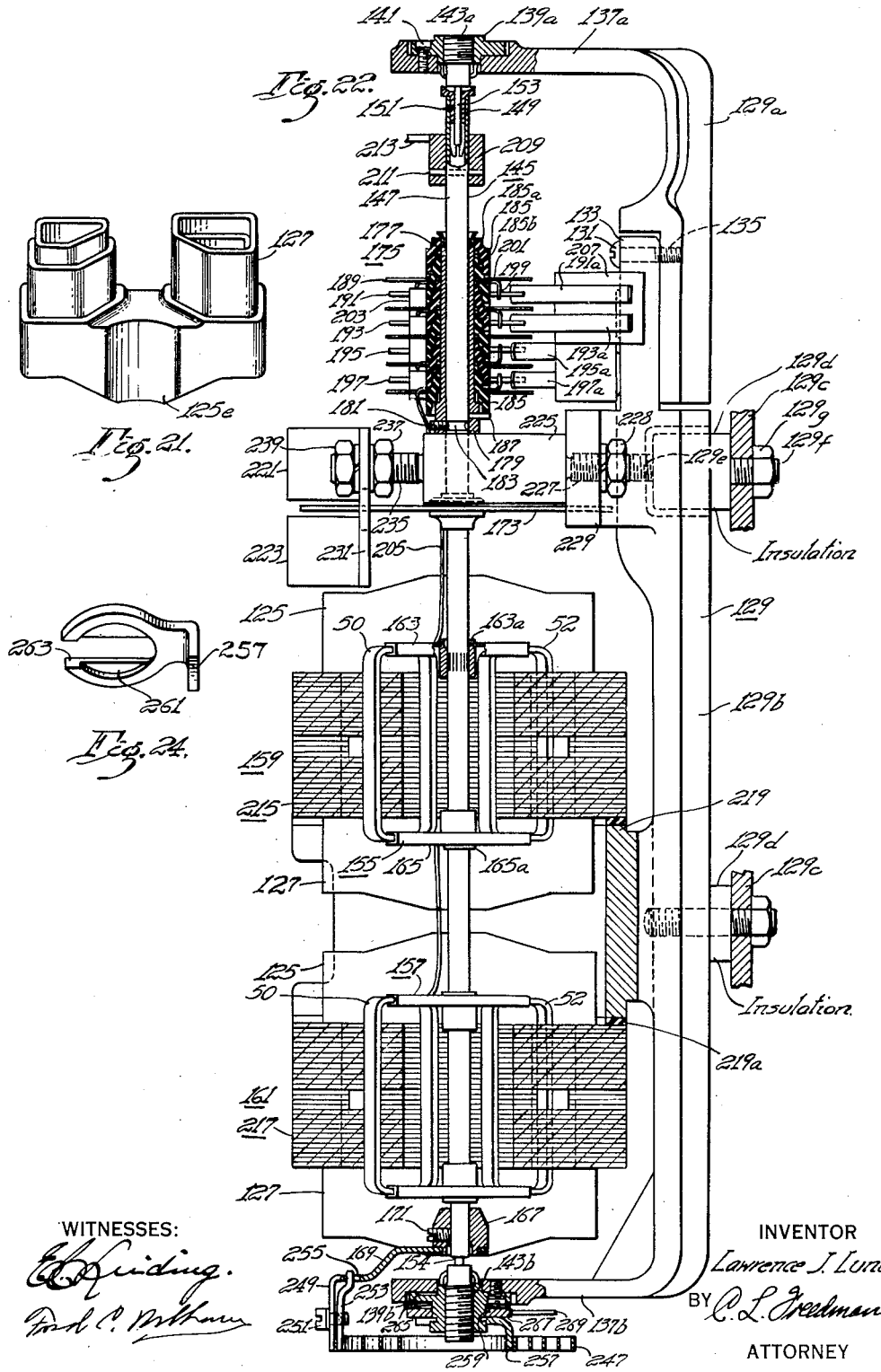

UNITED STATES PATENT OFFICE 2,508,410

MOVING COIL MEASURING INSTRUMENT

Lawrence J. Lunas, Cedar Grove, N. J., assignor to Westinghouse Electric Corporation, East Pittsburgh, Pa., a corporation of Pennsylvania Application December 27, 1944, Serial No. 570,028

47 Claims. (Cl. 171—95)

This invention relates to electrical instruments and it has particular relation to electrical measuring instruments of the electrodynamic type.

As well understood in the art, an electrodynamic instrument includes one or more movable coils rotatably mounted with respect to one or more fixed windings. Depending on the type of energization employed, the electrodynamic instrument may be responsive to various variable electrical quantities such as voltage, current and power. The electrodynamic instrument may be energized either with direct current or with alternating current, and may be employed as a relay for actuating relay contacts, or as a measuring instrument either of the indicating type or of the recording type. The invention is directed primarily to an electrodynamic instrument having a movable coil mounted for rotation about an axis intermediate two sides of the coil, both of the sides being employed in developing torque for actuating the instrument.

In the prior art, an electrodynamic instrument of the foregoing type has been provided with a magnetic structure to form what may be termed an "ironclad" instrument. This magnetic structure provided a path for magnetic flux, but it included an air gap of such great length that the magnetic structure added little to the efficiency of the instrument. As a matter of fact, the magnetic structure was more effective as a shield than as a device for increasing the efficiency of the instrument. Furthermore, the magnetic structure employed in the prior art was formed in two or more parts which must be assembled or disassembled during the assembling or disassembling of the instrument. The multipart construction is objectionable for the reasons that it complicates the construction and maintenance of the instrument and it renders difficult the provision of accurate air gaps.

In accordance with the invention, an electrodynamic instrument of the above-mentioned type is provided with a magnetic structure permanently assembled and preferably of one-piece construction. The magnetic structure has a magnetic core passing through the movable coil, but this core is provided with a passage through which the movable coil may be inserted in or removed from operative position with respect thereto. In addition, a small air gap is employed which results in an extremely efficient instrument.

In order to provide certain desired characteristics in the instrument, a magnetic part is employed which is asymmetric with respect to the path of travel of the movable coil. Consequently, when the movable coil alone is energized, the movable coil tends to seek a position wherein the magnetic reluctance of the magnetic path provided for magnetic flux produced by current flowing in the movable coil is a minimum. This may be termed a "solenoid action," and introduces a source of error which cannot be readily corrected in certain cases by calibration.

In accordance with a further aspect of the invention, the solenoid action is substantially eliminated by providing a magnetic structure for an electrodynamic instrument which is formed of two magnetic parts or sections, each asymmetric with respect to the path of travel of the movable coil. The magnetic sections are so constructed and located that the resultant magnetic structure formed thereby is substantially symmetric with respect to the path of travel of the movable coil. For this reason the solenoid action introduced by one of the magnetic sections is substantially compensated by the solenoid action introduced by the other of the magnetic sections.

The magnetic sections have passages extending therethrough to facilitate removal of the movable coil from the magnetic structure. However, since the magnetic sections have their asymmetries oppositely disposed with respect to the path of the movable coil, the passages in the sections are not in alignment. To permit withdrawal and insertion of the movable coil with respect to the magnetic structure, the magnetic sections are spaced apart in the direction of the axis of rotation of the movable coil by a distance sufficient to permit movement of a side of the coil therebetween. By suitable manipulation the movable coil may be passed through the resultant passage formed by the passages in the sections and the space between the sections.

The invention also contemplates the provision of two elements, each including a magnetic structure and a movable coil with the movable coils of the two elements mounted in alignment on a common shaft. The elements are spaced apart sufficiently to permit rotation of one of the coils between the elements. By suitable manipulation the complete coil assembly may be removed through the passages in the sections employed in the magnetic structures and the spaces between the sections of each magnetic structure, and may be replaced in operative position with respect to the magnetic structures without dismantling the magnetic structures or the coil assembly.

It is therefore an object of the invention to provide an improved electrodynamic instrument having a movable coil mounted for rotation with respect to a fixed winding about an axis which is intermediate two sides of the movable coil.

It is a further object of the invention to provide an electrodynamic instrument having a unitary magnetic structure providing a separate air gap for each of two sides of a movable coil.

It is another object of the invention to provide an electrodynamic instrument having a magnetic structure formed of two magnetic sections each asymmetric with respect to the path of travel of the movable coil of the instrument and having their asymmetries so disposed that the resultant magnetic structure is substantially symmetric with respect to the path of travel of the movable coil.

It is another object of the invention to provide an electrodynamic instrument having a magnetic structure through which a movable coil may be inserted into operative position or removed therefrom without disturbing the magnetic structure.

It is a further object of the invention to provide an electrodynamic instrument having a magnetic structure through which a movable coil may be inserted in mounted position or removed therefrom without disturbance to the magnetic structure, the magnetic structure having substantially no solenoid action with respect to the movable coil.

It is a still further object of the invention to provide a two-element electrodynamic instrument having magnetic structures in which a pair of movable coils may be inserted in or removed from mounted position without disturbance to the magnetic structures and wherein the magnetic structures have substantially no solenoid action with respect to the movable coils.

It is an additional object of the invention to provide an improved electrodynamic instrument which is substantially immune to externally-produced magnetic field influence.

Other objects will be apparent from the following description taken in conjunction with the accompanying drawings, in which:

Figure 1 is a schematic view of an electrodynamic instrument having a magnetic core;

Figs. 2 to 9, inclusive, are schematic views of embodiments of electrodynamic instruments which illustrate the invention;

Figs. 10 to 15, inclusive, are schematic views showing connections of moving coil assemblies suitable for certain of the electrodynamic instruments illustrated in Figs. 2 to 9, inclusive;

Fig. 16 is a view in perspective with parts exploded of an electrodynamic instrument embodying the invention;

Fig. 17 is a view in perspective with parts broken away of the instrument shown in Fig. 16;

Fig. 18 is a view in side elevation of a two-element electrodynamic instrument embodying the invention;

Fig. 19 is a schematic view of circuit connections suitable for the instrument of Fig. 16;

Fig. 20 is a view in sectional elevation with parts broken away showing winding insulation suitable for the instrument of Fig. 16;

Fig. 21 is a detailed view in perspective of a portion of the insulation illustrated in Fig. 20;

Fig. 22 is a view in sectional elevation with parts broken away of a two-element electrodynamic instrument embodying the invention;

Fig. 23 is a view in perspective of a damping magnet assembly suitable for the instrument of Fig. 22;

Fig. 24 is a detailed view in perspective of a bracket employed in the instrument of Fig. 22; and Figs. 25 to 28, inclusive, are views in perspective of further embodiments of electrodynamic instruments embodying the invention.

Referring to the drawings, Fig. 1 shows an electrodynamic electrical instrument which includes a cylindrical magnetic core 2 and a pair of outer magnetic pole pieces 4 and 6 which are spaced from the magnetic core 2 to define therewith a pair of air gaps 8 and 10. The magnetic core and the pole pieces form parts of a magnetic structure which is completed by a magnetic conductor 12. The magnetic core, the pole pieces and the magnetic conductor may be formed of a soft magnetic material, such as silicon iron. A winding 14 surrounds the conductor 12 and, when energized by direct current produces a flow of magnetic flux in the direction indicated by the arrow $\phi$. With the direction of flow of magnetic flux illustrated in Fig. 1, the pole piece 6 may be termed a north pole indicated by the reference character N, whereas the pole piece 4 is a south pole S. If the winding 14 is energized by alternating current, the arrow $\phi$ and reference characters N and S indicate instantaneous conditions.

A moving coil 16 surrounds the cylindrical magnetic core 2 and is secured to a shaft 18 for rotation about the axis of the shaft. This moving coil has one side 20 positioned for movement through the air gap 8 and a second side 22 positioned for movement through the air gap 10. It will be observed that the shaft 18 is positioned intermediate the two sides 20 and 22. As well understood in the art, when an electrical current is directed through the coil 16, the current flowing through the coil side 20 coacts with the magnetic field in the air gap 8 to produce a torque acting on the coil 16 about the shaft 18. In addition, current flowing through the coil side 22 produces an additional torque acting on the coil about the shaft 18. Movement of the coil in response to the resultant torque acting thereon is opposed by a spring (not shown in Fig. 1). As also understood in the art the winding 14 and coil 16 may both be energized by direct current or both may be energized by alternating current.

As previously pointed out, the removal of the moving coil 16 from the instrument illustrated in Fig. 1 requires the removal of the magnetic core 2 from the remainer of the magnetic structure. The removal of the magnetic core 2 is objectionable for the reasons that it tends to change the resultant characteristics of the magnetic structure upon reassembly thereof, it increases the possibility of damage to the moving coil and the pivots associated therewith and it necessitates the realignment of the magnetic core with the remainder of the instrument after each reassembly thereof.

To facilitate assembly and disassembly of the instrument, the magnetic core 2 is replaced by two magnetic parts 24 and 26 (Fig. 2) which are spaced apart to provide a passage through which a moving coil may be moved. The magnetic parts 24 and 26 may be termed magnetic cores which coact to form a resultant magnetic core or they may be termed inner magnetic pole pieces. The magnetic structure of Fig. 2 otherwise is similar to that of Fig. 1.

In Fig. 2, a coil assembly 28 is provided which corresponds to the moving coil 16 of Fig. 1. This moving coil is mounted on a shaft 30 for rotation about the axis of the shaft. If desired, the coil assembly 28 may be similar to the moving coil 16 of Fig. 1. However, since the inner pole pieces 24 and 26 are separated from each other, the coil assembly 28 may be formed of two moving coils each embracing a separate one of the inner pole pieces 24 and 26. Such a coil assembly will be illustrated and discussed below. It should be noted that the shaft 30 may be a through shaft extending completely through the space between the inner pole pieces 24 and 26.

The space between the inner pole pieces 24 and 26 provides a passage 32 which is proportioned to permit movement of the coil assembly 28 therethrough from a position external to the magnetic structure to a position wherein the coil may be rotated to advance its sides 34 and 36 into the associated air gaps 8 and 10. This greatly facilitates the assembly and disassembly of the instrument. For example, let it be assumed that the coil assembly 28 is to be removed from its associated magnetic structure. To effect such removal, the coil assembly 28 may be rotated in a counterclockwise direction, as viewed in Fig. 2, from the position illustrated in full lines through a predetermined path to the position illustrated in broken lines. When the coil is in the position illustrated in broken lines, it may be moved through the passage 32 in a direction parallel to the shaft 30 or transverse thereto to a position external to the magnetic structure. It should be noted that such removal of the coil does not disturb the magnetic circuit in any way. Consequently, the objections noted with respect to Fig. 1 are completely avoided. An opposite procedure may be followed to reinsert the coil assembly 28 in its operative position with respect to its associated magnetic structure.

The separation of the inner pole pieces 24 and 26 introduces a very appreciable air gap represented by the passage 32 into the magnetic circuit through which the magnetic flux φ flows. Although the instrument of Fig. 2 is operative, the presence of a large air gap in the magnetic circuit is not desirable. Such an air gap introduces a large magnetic reluctance in the magnetic circuit, and decreases the efficiency of the magnetic circuit.

To eliminate the air gap represented by the passage 32 from the magnetic circuit established by the magnetic structure illustrated in Fig. 2, the connections of the magnetic circuit may be modified. The presence of two completely independent pole pieces 24 and 26 between the outer pole pieces 4 and 6 permits a substantial variety in the connections of the magnetic circuit. For example, the air gaps 8 and 10 may be connected in series, in parallel, or in independent magnetic circuits as desired. Suitable connections for the pole pieces are illustrated in Figs. 3 to 8.

Referring to Fig. 3, it will be observed that the outer pole pieces 4 and 6 again are connected by the magnetic conductor 12. In addition, the inner pole pieces 38 and 40, which correspond to the inner pole pieces 24 and 26 of Fig. 2, are connected by means of a magnetic conductor 42. Since the inner pole pieces 38 and 40 are magnetically connected, the passage 44 therebetween may be made substantially larger than the passage 32 of Fig. 2 without appreciably increasing the magnetic reluctance of the resulting magnetic circuit. By inspection of Fig. 3, it will be observed that the air gaps 8 and 10 are connected in series, the direction of flux in the associated magnetic circuit being illustrated by the arrows φ for direct-current operation (instantaneous direction for alternating-current operation). For example, magnetic flux flows from the inner pole piece 38, which may be termed a north pole N through the air gap 8, the outer pole piece 4, which may be termed a south pole S, the magnetic conductor 12, the outer pole piece 6, which may be termed a north pole N, the inner pole piece 40 which may be termed a south pole S and the conductor 42 to the inner pole piece 38. Energization of the winding 14 by direct current or alternating current, as the case may be, produces the flux represented by the arrow φ. It will be observed that the directions of flux flow in the air gaps 8 and 10 are similar to the directions of magnetic flux flow in the air gaps of Fig. 1. Therefore, the torques which are applied to the coil 16 of Fig. 3 when current flows therethrough are similar to the torques applied to the coil 16 of Fig. 1 when the latter is energized. Since the magnetic conductors 12 and 42 are so disposed that they are external to the moving coil 16 when the moving coil is in the position indicated by broken lines in Fig. 3 and since they are displaced from the path of the moving coil as it rotates in a counterclockwise direction from the position illustrated in full lines in Fig. 3 to the position illustrated in broken lines therein, the magnetic conductors do not interfere with the removal of the coil from the associated magnetic structure or the reinsertion of the magnetic coil in its magnetic structure. Such removal or reinsertion may be accomplished in the manner discussed with reference to Fig. 2.

Fig. 4 also discloses a circuit wherein the air gaps 8 and 10 are connected in series in a magnetic circuit, but the connections differ slightly from those illustrated in Fig. 3. In Fig. 4, the inner pole piece 38 is connected by a magnetic conductor 46 to the outer pole piece 6 whereas the inner pole piece 40 is connected by a magnetic conductor 48 to the outer pole piece 4. With the directions of flux flow indicated by the arrows φ, magnetic flux flows from the inner pole piece 38 through the air gap 8, the outer pole piece 4, the magnetic conductor 48, the inner pole piece 40, the air gap 10, the outer pole piece 6 and the magnetic conductor 46 to the inner pole piece 38. The winding 14 may be energized by direct current for producing a flow of magnetic flux in the directions indicated by the arrows φ. For alternating-current operation the arrows indicate instantaneous directions of flow.

It will be observed that the direction of magnetic flux flow in the air gap 8 is similar to that in the air gap 8 of Fig. 1. However, the direction of flow of magnetic flux in the air gap 10 of Fig. 4 is opposite to that of the magnetic flux in the air gap 10 of Fig. 1. Consequently, if the coil 16 of Fig. 1 were employed with the magnetic structure of Fig. 4, the torques applied to the coil would be in opposite directions about the shaft 30. For this reason, the magnetic structure of Fig. 4 is provided with a pair of moving coils 50 and 52 each of which is associated with a separate one of the air gaps 8 and 10. For example, the moving coil 50 has a side 54 disposed for movement through the air gap 8 whereas the moving coil 52 has a side 56 disposed for movement through the air gap 10. By suitable connections of the coils, the torques applied thereto when the coils are energized may be cumulative or differential, as desired. For example, the coils may be connected in series to apply torques cumulatively to the shaft 30. On the other hand, the coils may be energized from separate sources of electrical energy to apply their torques either cumulatively or differentially to the shaft 30. These connections of the coils will be discussed at greater length below. Since the magnetic conductors 46 and 48 are positioned to permit movement of the moving coils 50 and 52 in a counter-clockwise direction from the position illustrated in full lines to the position illustrated in broken lines in Fig. 4 and since they do not pass through either of the moving coils when the moving coils are in the positions indicated by broken lines, the moving coil assembly may be removed from its associated magnetic structure and reinserted therein in the manner discussed with reference to Fig. 2.

With reference to the modification illustrated in Fig. 5, the air gaps 8 and 10 are connected in parallel in a magnetic circuit. For example, the inner pole piece 38 and the outer pole piece 6 are connected by magnetic conductors 58 and 60 to one end of a magnetic conductor 62. The outer pole piece 4 and the inner pole piece 40 are connected by magnetic conductors 64 and 66 to the remaining end of the magnetic conductor 62. The directions of magnetic flux flow for direct-current energization of the winding 14 (or instantaneous directions for alternating-current energization) are indicated by arrows $\phi$. It will be observed that magnetic flux from the magnetic conductor 62 flows through the magnetic conductors 58 and 60 to the inner pole piece 38 and the outer pole piece 6 which may be termed north poles N. From these pole pieces the magnetic flux travels across the air gaps 8 and 10 to the outer pole piece 4 and the inner pole piece 40. Consequently, the air gaps 8 and 10 in effect are connected in parallel between the ends of the magnetic conductor 62. Since the directions of flow of magnetic flux in the air gaps 8 and 10 are similar to the directions of flow of magnetic flux in the air gaps 8 and 10 of Fig. 1, the coil 16 may be employed in Fig. 5 and will operate in a manner similar to its operation in the instrument of Fig. 1. The magnetic conductors 58, 60, 64 and 66 are located to permit removal of the coil 16 in the manner discussed with reference to Figs. 2, 3 and 4. Any portion of the pole pieces and magnetic conductors of Fig. 5 may have a winding associated therewith, such as the winding 14, which when energized is capable of directing magnetic flux in the directions illustrated by the arrows $\phi$.

In Fig. 6, the air gaps 8 and 10 are connected in parallel between the ends of a magnetic conductor 68. For example, the inner pole piece 38 and the inner pole piece 40 are both connected to one end of the magnetic conductor 68 through magnetic conductors 70 and 72. The outer magnetic pole pieces 4 and 6 are connected through magnetic conductors 74 and 76 to the remaining end of the magnetic conductor 68. Suitable directions of flow of magnetic flux are indicated by the arrows $\phi$. It will be observed that the directions of magnetic flux flow in the air gaps 8 and 10 are similar to the corresponding directions for the instrument of Fig. 4. Consequently, the coils 50 and 52 may be employed for the instrument of Fig. 6. The magnetic conductors 68, 70, 72, 74 and 76 are so located that they permit removal of the coils 50 and 52 in the instrument of Fig. 6 in the same manner discussed with reference to Fig. 4. Any portion of the pole pieces or magnetic conductors may have associated therewith a winding such as the winding 14 on the conductor 68 which is capable of directing magnetic flux in the directions illustrated by the arrows $\phi$.

In Fig. 7, the air gaps 8 and 10 are provided with independent magnetic circuits for independent magnetic energization. The pole pieces 4 and 38 are connected by a magnetic conductor 78, whereas the pole pieces 6 and 40 are connected by a magnetic conductor 80. Suitable directions of flow of magnetic flux are indicated by the arrows $\phi$ adjacent the magnetic conductors. For the specific directions of flow of magnetic flux indicated in Fig. 7, the directions of flow of magnetic flux in the air gaps 8 and 10 are similar to the directions of flow of magnetic flux in the air gaps 8 and 10 of Fig. 1. Consequently, the coil 16 may be employed in Fig. 7 in the same manner discussed with reference to Fig. 1. In addition, since the inner pole pieces 38 and 40 are separated, the coil 16 may be removed or inserted with respect to its associated magnetic structure in the manner discussed with reference to Fig. 2. Any desired portion of the magnetic circuit which includes the pole pieces 4 and 38 and the magnetic conductor 78 may have associated therewith a winding such as the winding 14a on the conductor 78, which, when energized, is capable of directing magnetic flux in the direction indicated by the arrow $\phi$. Similarly, any portion of the magnetic circuit which includes the pole pieces 6 and 40 and the magnetic conductor 80 may have associated therewith a winding, such as the winding 14b on the magnetic conductor 80, which, when energized, is capable of directing flux in the indicated direction. As previously explained, for alternating-current energization of the windings the arrows $\phi$ indicate instantaneous directions.

By reversing the direction of flow of magnetic flux in the magnetic conductor 80, the direction of flow of magnetic flux in the air gap 10 also is reversed. Such reversal is illustrated in Fig. 8. The directions of flow of magnetic flux in the air gaps 8 and 10 of Fig. 8 are similar to those in the air gaps 8 and 10 of Fig. 4. Consequently, the coils 50 and 52 are employed in the embodiment of Fig. 8. These coils may be removed from their associated magnetic structures in the manner discussed with reference to Fig. 4.

The pole piece constructions illustrated in Figs. 2 to 8 lend themselves admirably to the construction of a ratio-type instrument. For example, in Fig. 9 an inner pole piece 38a is provided which corresponds to the inner pole piece 38 of Figs. 3 to 8. However, the inner pole piece 38a is configured to provide, in cooperation with the outer pole piece 4, an air gap 8a which tapers from a large length adjacent its upper end (as viewed in Fig. 9) to a smaller length adjacent its lower end. In an analogous manner, an inner pole piece 40a is provided which cooperates with the pole piece 6 to provide an air gap which tapers from a large length adjacent its upper end to a smaller length adjacent its lower end. The coils 50 and 52 are associated with these tapered air gaps. When the pole pieces of Fig. 9 are energized in accordance with the teachings of any of the modifications of Figs. 3 to 8, and the coils 50 and 52 are energized from independent sources of energy to apply torques differentially to the shaft 30, the coil assembly takes a position corresponding to the ratio between the energizations of the two coils.

To illustrate the operation of a ratio-type instrument, let it be assumed that the coil 50 is energized from one source to produce a torque acting in the direction of the arrow 82 and that the coil 52 is energized from another source to produce a torque acting in the direction of the arrow 84. Let it be assumed further that the coils 50 and 52 are similar in construction. It will be noted that the coil 50 has a side disposed in the gap 8a at a position wherein the gap has a short length and consequently a relatively strong magnetic field. On the other hand, the coil 52 has a side disposed in the gap 10a which is in a position wherein the gap has a substantial length and a relatively weak magnetic field. If the currents supplied to the coils 50 and 52 are equal, and the coils are in the position illustrated in full lines in Fig. 9, the torque developed by the coil 50 is substantially greater than that developed by the coil 52. Consequently, the coil assembly will rotate in a clockwise direction to move the coil 50 gradually into a weaker part of the magnetic field in the air gap 8a as the coil 52 moves into a stronger part of the magnetic field in the air gap 10a. This rotation continues until the torques developed by the two coils are equal. This condition is assumed to exist when the coils are in the position illustrated in broken lines in Fig. 9. If the ratio of the current in the coil 50 to that in the coil 52 increases above unity, the coil assembly will rotate still further in a clockwise direction until the torques developed by the coils again are equal. Consequently, the instrument of Fig. 9 may be calibrated to indicate the ratio between these two currents.

As above pointed out, sometimes it is expedient to use a pair of moving coils 50 and 52 in place of the single moving coil 16. Connections suitable for the moving coils 50 and 52 are illustrated in Figs. 10 to 15. In Fig. 10, the two coils 50 and 52 are connected in series between two terminals 86 and 88 through flexible conductor strips 90. It will be recalled that the coil 50 has a side disposed in the air gap 8, whereas the coil 52 has a side disposed in the air gap 10. The connection in Fig. 10 is assumed to be such that the currents flowing in these two sides flow in opposite directions. Such a connection of the two coils 50 and 52 is suitable when the coils are employed with the magnetic structures illustrated in Figs. 2, 3, 5 and 7. The same directions of current flow through the coils may be obtained by connecting them in parallel between the terminals 86 and 88, as illustrated in Fig. 11. Consequently, the connections illustrated in Fig. 11 also are suitable for the magnetic structures illustrated in Figs. 2, 3, 5 and 7.

In Fig. 12, the windings 50 and 52 again are connected in series but the direction of flow of current in the coil 52 is reversed from the direction illustrated in Fig. 10. Also, in Fig. 13, the coils 50 and 52 are connected in parallel between the terminals 86 and 88 but the directions of flow of current in the coils are similar to those obtained by the connections of Fig. 12. Consequently, the connections of Figs. 12 and 13 are suitable for the magnetic structures illustrated in Figs. 4, 6 and 8.

In Fig. 14, one lead of each of the coils 50 and 52 is connected to the terminal 86. The remaining lead of the coil 50 is connected to the terminal 88. The remaining lead of the coil 52 is connected to a terminal 92. Consequently, the coils 50 and 52 may be energized from separate sources of electrical energy and the directions of flow occurring in the two windings depend on the specific connections employed between the sources of energy and the terminals. By properly directing the flow of currents in the two windings, the connections of Fig. 14 may be employed with any of the magnetic structures employed in Figs. 2 to 9, inclusive.

In certain cases, it may be desirable to energize the two windings 50 and 52 from sources which are completely insulated from each other. In such cases, the coils 50 and 52 may have completely independent terminals 86, 94, 88 and 92, as illustrated in Fig. 15. Since the connections to these terminals may be selected to direct current through the windings in any direction, the connections of Fig. 15 may be employed with any of the magnetic structures illustrated in Figs. 2 to 9. For example, the directions of flow of current in the coils 50 and 52 may be selected to apply cumulative torques to the associated shaft of the instrument. The instrument then totalizes the currents supplied to the two coils when the coils are employed with the magnetic structures of Figs. 2 to 8, inclusive. Alternatively, the directions of flow of currents in the two coils may be selected to apply torques differentially to the instrument shaft. The instrument then indicates the difference between the currents energizing the two coils. Also, the two coils 50 and 52 may be employed with the magnetic structure of Fig. 9 to indicate the ratio between two currents. The terminal arrangement of Fig. 15 additionally permits the connection of the coils 50 and 52 externally of the instrument to provide the equivalent of any of the connections illustrated in Figs. 10 to 14. Energization of the coils from independent sources is of particular convenience in some direct-current measuring operations.

The coil connections illustrated in Figs. 12 and 13 are particularly desirable when employed in the instrument of Fig. 8 if astatic operation or freedom from external field influence is desired. In the instrument of Fig. 8, any stray magnetic field which increases the magnetic field strength in one of the air gaps must decrease the magnetic field strength in the remaining air gap. Consequently, such an instrument is substantially astatic in operation.

An instrument designed in accordance with Fig. 7 is shown in detail in Fig. 16. This is an electrodynamic instrument which includes a stator assembly 1 and a rotor assembly 1a. The rotor assembly comprises a coil 3 which is mounted for rotation about an axis intermediate two sides 5 and 7 of the coil. If desired, stub shafts may be attached to each end of the coil 3 for the purpose of mounting the coil for rotation. However, in the specific embodiment illustrated, the coil 3 is secured to a continuous shaft 9 which is mounted for rotation in bearings represented by bearing screws 11 and 13. The utilization of a continuous shaft simplifies the problem of constructing a sturdy rotor assembly.

In order to connect the coil 3 to an external circuit, a pair of spiral, flexible conductor strips 15 and 17 have their inner ends respectively attached to insulating bushings 19 and 21 which are secured to the shaft 9. The terminals of the coil 3 are connected respectively to the inner ends of the conductor strips 15 and 17. The outer ends of the conductor strips are attached respectively to lugs 23 and 25 which are attached to the stator assembly and which are insulated therefrom. Suitable conductors 27 and 29 may be soldered to the lugs 23 and 25 for the purpose of establishing connections between the movable coil 3 and an external circuit.

The rotor assembly is biased towards a predetermined position by means of a spiral control spring 31 which has its inner end attached to the shaft 9 and its outer end attached to a lever 33 which may be adjusted angularly about the shaft 9 for the purpose of calibrating the instrument. Rotation of the rotor assembly is damped by means of an electroconductive armature disk 35 which is secured to the shaft 9 and which is positioned for rotation between the poles of a permanent magnet 37. Suitable indicating means in the form of an arm 39 is attached to the shaft 9 for rotation therewith. In the specific embodiment of Fig. 16, the arm 39 carries at its end a pen 41 which is positioned for movement across the surface of a chart 43. As well understood in the art, the chart 43 may be advanced continuously with respect to the pen 41 in order to provide a continuous record of the quantity being measured by the instrument.

The stator assembly 1 includes a magnetic structure 45 which establishes magnetic paths for the magnetic fluxes produced by currents flowing in the coil 3 and in fixed windings 47 and 49 which are associated with the magnetic structure. The magnetic structure 45 includes a magnetic section 51 having a substantially continuous magnetic body or rim portion 53 which substantially surrounds the shaft 9 and the coil 3. A pair of pole pieces 55 and 57 project from opposite interior surfaces of the rim portion 53 to provide arcuate pole faces adjacent the paths of travel of the coil sides 5 and 7. In addition the magnetic section 51 has a pair of cantilever arms or magnetic cores 59 and 61 which project from opposite interior faces of the rim portion 53 and which pass through the coil 3 on opposite sides of the shaft 9. These magnetic cores 59 and 61 are spaced in a direction transverse to the shaft 9 by a distance sufficient to permit passage of the movable coil 3 therebetween. Furthermore, the magnetic cores 59 and 61 have arcuate surfaces spaced from the pole pieces 55 and 57 to provide a pair of arcuate air gaps within which the coil sides 5 and 7 are disposed for movement. It will be noted that the magnetic cores 59 and 61 provide a substantially cylindrical magnetic core which is attached on opposite sides to the rim portion 53 and which has the passage 63 extending therethrough. Since the passage 63 communicates with the air gaps in which the coil sides 5 and 7 are positioned, the coil 3 may be rotated in a counterclockwise direction (as viewed looking at the rotor assembly from the control spring end) to bring the coil into alignment with the passage 63. The coil then may be moved in a direction parallel to the shaft 9 through the passage 63.

The magnetic section 51 may be formed of any suitable soft magnetic material such as silicon iron. Preferably a material having low hysteresis loss is employed. The magnetic section 51 may be formed of a solid piece of soft iron. However, it is preferable to form the magnetic section 51 of a plurality of laminations as shown in Figs. 16 and 17, particularly if the instrument is designed for measuring alternating current quantities. The laminations may be provided with suitable openings 65 through which rivets may be passed for the purpose of securing the laminations together. If the magnetic section is formed of laminations, the desired contour of each lamination may be accurately formed by a punching operation.

By inspection of Figs. 16 and 17, it will be noted that a separate magnetic path is provided for each of the coil sides 5 and 7. The magnetic path for the coil side 5 includes the pole piece 55 and the magnetic core 59 together with the air gap therebetween. The winding 47, when energized, directs magnetic flux through this magnetic path to provide a magnetic field for the magnetic coil side 5. In a similar manner, the magnetic path for the coil side 7 includes the magnetic core 61 and the pole piece 57 together with the air gap therebetween. When the winding 49 is energized, magnetic flux is directed through the associated magnetic path to establish a magnetic field for the coil side 7. Each of the magnetic cores tapers from a large cross section adjacent the rim portion 53 to a smaller cross section adjacent the tip of the magnetic core. Since the magnetic flux varies in magnitude in the direction of the taper, the variation in flux density throughout each of the magnetic cores is not excessive.

Although the magnetic section 51 alone may be employed, some improvement in performance may be obtained by adding thereto an additional magnetic section 67. The reason for this additional magnetic section may be understood by considering the solenoid action of the magnetic section 51 when employed alone. The magnetic section 51 is asymmetric with respect to the path of travel of the movable coil 3. When the coil 3 is in its extreme counterclockwise position (looking at the rotor assembly from the control-spring end thereof) the magnetic reluctance of the magnetic path offered to magnetic flux produced by current flowing through the coil 3 is a maximum. Conversely, when the coil 3 is adjacent its extreme clockwise position the magnetic reluctance offered to magnetic flux produced by current flowing in the coil 3 is a minimum. Consequently when the coil 3 is energized and the coils 47 and 49 are deenergized, the coil 3 tends to take a position wherein the magnetic reluctance of the associated magnetic path is a minimum. This may be termed a solenoid action and the force applied to the coil 3 by the solenoid action urges the coil in a clockwise direction. In some cases, as when the energization of the fixed windings is constant, it is possible to calibrate the instrument to read correctly despite the presence of this solenoid action. However, this solenoid action is substantially compensated by the provision of the additional magnetic section 67. The compensation permits substantially correct indication by the instrument for substantially all applications thereof.

The magnetic section 67 is similar in construction to the magnetic section 51 but is reversed with respect to the magnetic section 51 about a line transverse to the shaft 9. The magnetic section 67 has a pair of magnetic cores 69 and 71 which extend through the coil 3 on opposite sides of the shaft 9. In addition, the magnetic section 67 has a pair of pole pieces 73 and 75 which are positioned respectively in the coils 47 and 49. It will be observed that the magnetic cores 69 and 71 are spaced to provide a passage 77 therebetween which corresponds to the passage 63 of the magnetic section 51.

Since the magnetic section 67 is reversed with respect to the magnetic section 51, the force due to solenoid action which is applied thereby to the coil 3 is opposed to the force developed by the solenoid action of the magnetic section 51. Consequenly, the resultant magnetic structure is substantially free of errors resulting from solenoid action. The magnetic cores 59, 61, 69 and 71 all pass through the coil 3 to form a resultant magnetic core therefor which is substantially symmetric with respect to the path of movement of the coil 3.

By inspection of Fig. 16, it will be observed that the passages 63 and 77 are displaced angularly about the shaft 9 with respect to each other. Consequently the coil 3 cannot be removed from the magnetic structure 45 by a simple movement thereof in the direction of the shaft 9. To permit removal of the coil from the magnetic structure the magnetic sections 51 and 67 are spaced from each other along the shaft 9 by a distance sufficient to permit movement of a side of the coil 3 therebetween. The desired spacing may be provided by any suitable spacer formed of either magnetic or nonmagnetic material. In the embodiment illustrated in Figs. 16 and 17, the spacer is divided into two parts 79 and 79a. Each of the parts is in the form of a plurality of magnetic laminations which are similar in construction to the adjacent parts of the laminations of the magnetic section 51. In order to facilitate inspection of the space between the magnetic sections 51 and 67 after assembly thereof, the parts 79 and 79a are located at a substantial distance from each other to provide an opening 79b (Fig. 17) in the magnetic structure 45. The space between the magnetic sections is clearly visible through this opening. Consequently, when the magnetic sections 51 and 67 are assembled with the spacer therebetween as shown in Fig. 17, a space is provided between the pair of magnetic cores 59 and 61 and the pair of cores 69 and 71. This space is sufficient to permit movement of a side of the coil 3 therebetween.

It is believed that the operations required to assemble and disassemble the instrument illustrated in Figs. 16 and 17 are apparent from the foregoing discussion. To facilitate a further description of such operations, reference will be made to a leading side 3a of the coil 3 (the lower side of the coil 3 as viewed in Figs. 16 and 17), and a trailing side 3b (the upper side of the coil as viewed in Figs. 16 and 17). It will be understood that the magnetic structure 45 comprising the laminations of the magnetic sections 51 and 67 and the laminations of the spacer is first completely assembled as shown in Fig. 17 wherein a rivet 45a is disclosed for uniting the laminations to each other. Also the rotor assembly 1a is completely assembled, the complete assembly including the shaft 9, the coil 3, the conductor strips 15 and 17, the disk 35, the arm 39 and the control spring 31. The rotor assembly then is placed above the magnetic structure 45 (as viewed in Figs. 16 and 17) with the leading side 3a of the coil aligned with the passage 63 of the magnetic section 51. The rotor assembly including the coil 3 then is lowered in a direction parallel to the axis 9 to pass the leading side 3a completely through the passage 63. The leading side 3a of the coil now is positioned between the pair of magnetic cores 59 and 61 and the pair of cores 69 and 71.

To complete the insertion of the coil 3 into operative position, the rotor assembly including the coil next is rotated in a clockwise direction (looking at the rotor assembly from the control-spring end thereof) to bring the leading side 3a of the coil into alignment with the passage 77 of the magnetic section 67. During such rotation of the coil 3 the leading side 3a moves between the magnetic sections 51 and 67. After the leading side 3a has been brought into alignment with the passage 77, the rotor assembly is lowered in a direction parallel to the shaft 9 to pass the leading side 3a completely through the passage 77. The coil now is positioned to embrace the complete resultant magnetic core formed by the magnetic cores 59, 61, 69 and 71. The bearing screw 11 and the support therefor are next placed in position, and the bearing screws 11 and 13 are adjusted to mount the rotor assembly for rotation with respect to the magnetic structure. The outer ends of the conductor strips 15 and 17 are soldered to the lugs 23 and 25 and the permanent magnet 37 is positioned as shown in Fig. 16. To complete the installation of the rotor assembly, the outer end of the control spring 31 is soldered or otherwise secured to the lever 33. By following a reverse procedure the rotor assembly 1a may be removed from the magnetic structure 45 without disturbing the magnetic structure in any way.

From the foregoing discussion, it is clear that the magnetic structure 45 is formed of a plurality of unitary laminations each of which has integral pole pieces and magnetic cores. Because of this construction the magnetic structure may be provided with accurate air gaps, and the accuracy of the air gaps is not disturbed by assembly or disassembly of the instrument.

In certain applications a two-element electrodynamic instrument is required. Such an instrument may be constructed in the manner illustrated in Fig. 18. Referring to Fig. 18, a two-element electrodynamic instrument is disclosed which includes the two elements 81 and 83. The element 81 comprises a magnetic structure 85 which is similar in construction to the magnetic structure 45 of Figs. 16 and 17. It will be observed that the magnetic structure 85 has associated therewith a pair of fixed windings 87 and 89 which correspond to the fixed windings 47 and 49 of Figs. 16 and 17. In addition, the magnetic structure 85 has disposed therein a movable coil 91 which corresponds to the movable coil 3 of Figs. 16 and 17. The element 83 is similar in construction to the element 81 and includes a magnetic structure 93, fixed windings 95 and 97 and a movable coil 99. The magnetic structures 85 and 93 are mounted on suitable supporting posts 101 and are spaced from each other sufficiently to permit rotation of one of the movable coils therebetween. In certain cases it may be desirable to place magnetic shields 102 between the fixed windings 87 and 95 and between the fixed windings 89 and 97 to prevent magnetic interference between the windings on opposite sides of the shields.

The movable coils 91 and 99 are secured to a common shaft 103 for rotation therewith. This shaft carries a pair of conductor strips 105 for connecting the terminals of the movable coil 99 to an external circuit and a pair of conductor strips 107 for connecting the terminals of the movable coil 91 to an external circuit. These conductor strips correspond to the conductor strips 15 and 17 of Fig. 16. In addition, the disk 35, the pen arm 39 and the control spring 31 are secured to the shaft 103 with the disk 35 positioned for movement between the poles of the permanent magnet 37. As well understood in the art, each of the elements 81 and 83 may be energized from a separate pair of conductors of a three-wire circuit or from a separate phase of a polyphase circuit.

Since the principles employed in the construction of the instrument illustrated in Figs. 16 and 17 are also employed for the instrument of Fig.

18, it follows that the rotor assembly in Fig. 18 may be introduced into operative position with respect to the magnetic structures 85 and 93 or may be removed therefrom without disturbing the magnetic structures in any way. For example, in constructing the instrument, the magnetic structures 85 and 93 are completed and are secured to the supporting posts 101. For convenience in discussing the assembly of the instrument, the coil 99 will be referred to as having a leading side 99a and a trailing side 99b. The coil 91 will be referred to as having a leading side 91a and a trailing side 91b. This corresponds to the notation employed for the coil 3 of Figs. 16 and 17. The rotor assembly of Fig. 18 is first completely assembled. This rotor assembly includes the shaft 103, the coils 91 and 99, the conductor strips 105 and 107, the disk 35, the pen arm 39 and the control spring 31. The rotor assembly then is placed above the magnetic structure 85 as viewed in Fig. 18 with the leading side 99a of the coil 99 positioned above the adjacent passage in the magnetic structure 85. The rotor assembly then is dropped in a direction parallel to the shaft 103 rotated and again dropped to position the coil 99 for embracing the magnetic cores of the magnetic structure 85. This procedure is exactly similar to that employed for dropping the coil 3 of Figs. 16 and 17 through the passages 63 and 77 to embrace the associated magnetic cores.

The coil 99 then is passed completely through the magnetic structure 85 by rotating the coil until its trailing side 99b is in position to drop through the adjacent passage in the magnetic structure 85. After the trailing side has passed through the adjacent passage the coil 99 is rotated to pass the trailing side 99b between the magnetic sections of the magnetic structure 85 until the trailing side 99b is positioned to drop through the lower passage in the magnetic structure. The coil 99 now is lowered to a position between the magnetic structures 85 and 93.

The operation of passing a coil completely through its magnetic structure may be understood more fully by a further consideration of Figs. 16 and 17. Assuming that the coil 3 is in the position illustrated in Figs. 16 and 17 and that it is desired to drop the coil completely through its associated structure 45, the coil is rotated until its trailing side 3b is adjacent the passage 63 in the magnetic section 51. The coil now is lowered until the trailing side 3b is positioned between the magnetic sections 51 and 67. By suitably rotating the coil 3 in a clockwise direction (looking at the rotor assembly from the control spring end thereof) the trailing side 3b is moved through the magnetic sections 51 and 67 to a position wherein the trailing side is in alignment with the passage 77 in the magnetic section 67. The trailing side 3b now may be dropped through the passage 77 to complete the passage of the coil 3 through its associated magnetic structure 45. The operation of passing the coil 99 of Fig. 18 completely through the magnetic structure 85 is similar to that discussed for the coil 3 of Figs. 16 and 17.

With the coil 99 positioned between the magnetic structures 85 and 93 of Fig. 18, the rotor assembly is rotated to bring the leading side 99a of the coil 99 into alignment with the adjacent passage of the magnetic structure 93. The coil 99 next is dropped, rotated and again dropped in the manner previously discussed with reference to the coil 3 of Figs. 16 and 17 until the coil 99 is in position to embrace the magnetic cores of the associated magnetic structure 93. Since the magnetic structures 85 and 93 are similar, the movement of the coil 99 from a position between the magnetic structures 85 and 93 to a position wherein the coil 99 embraces the magnetic cores of the magnetic structures 93 also moves the coil 91 from a position above the magnetic structure 85 to a position wherein the coil 91 embraces the magnetic cores of the associated magnetic structure 85. Consequently both of the coils 91 and 99 are in their operative positions with respect to their associated magnetic structures. With the rotor assembly of Fig. 18 in this position, the bearings associated with the shaft 103 may be adjusted and the outer ends of the conductor strips 105 and 107 may be connected as discussed with reference to Figs. 16 and 17. In addition, the outer end of the control spring 31 may be connected to its associated lever 33 and the permanent magnet 37 may be moved to operative position with respect to the disk 35. The instrument of Fig. 18 now is in completely assembled condition. By following a reverse procedure, the rotor assembly of Fig. 18 may be removed completely from the magnetic structures 85 and 93 without disturbing the magnetic structures in any way.

Referring again to Figs. 16 and 17, the windings 47 and 49 are connected in series and are so energized that if direct current is passed therethrough, magnetic flux flows through the pole pieces in the directions illustrated by the arrows 109 and 110 of Fig. 16. If the windings are energized by alternating current, the arrows 109 and 110 represent instantaneous directions of magnetic flux flow.

The connections of electrodynamic instruments to external circuits are well understood in the art. Suitable connections for the instrument illustrated in Figs. 16 and 17 are illustrated in Fig. 19 wherein the instrument is associated with a single-phase alternating-current circuit having conductors L1 and L2. If the instrument is to be employed for measuring power, the movable coil may be energized in accordance with current flowing in the associated electrical circuit whereas the fixed windings may be energized in accordance with the voltage of the associated electrical circuit. However, as a rule, the movable coil is energized in accordance with voltage. As illustrated in Fig. 19, the coil 3 is connected across the conductors L1 and L2 through suitable multiplier resistors 111 and 113. The windings 47 and 49 are connected in series in one of the conductors L1 for energization in accordance with current flowing in the associated electrical circuit.

In instruments of the type herein disclosed which are provided with iron cores, and which are employed for measuring alternating quantities, some compensation is desirable for the hysteresis losses in the iron core. The losses may cause the current and magnetic flux lag in the current winding circuit to be less or greater than the inductive lag in the voltage coil circuit. Such compensation is provided in Fig. 19 by a capacitor 115. Depending on the magnitude and direction of the correction required, the capacitor 115 may be connected across the coil 3, across the coil and a part of the multiplier resistance (if the iron losses cause a flux lag in the current circuit greater than the inductive lag in the voltage coil circuit), or across the multiplier resistor alone (if the iron losses cause a flux lag in the current winding circuit less than the inductive lag in the voltage coil circuit). In a specific instrument designed in accordance with the invention, it was found that sufficient compensation was obtained by connecting the capacitor 115 across one-half the total multiplier resistance as illustrated in Fig. 19. The value of capacitance and the proportion of the resistance shunted thereby are selected to equalize the aforesaid lags.

One of the problems presented by the instrument of Fig. 16 resides in the provision of adequate insulation for the fixed windings 47 and 49. A desirable form of insulation which may be employed for the fixed windings is illustrated in Figs. 20 and 21 and is shown in Fig. 20 associated with the fixed winding 47. The insulation is formed of two U-shaped parts 125 and 127 which are similar in construction but which are inserted from opposite faces of the magnetic structure 45. The U-shaped part 125, for example, has a channel 125e between the flanges of which a part of the winding is disposed. From the ends of the channel web two generally tubular legs 125a and 125b project and surround portions of the fixed winding 47. In a similar manner the part 127 has generally tubular legs 127a and 127b. It will be noted that the leg 127a has a continuous male lip 127c projecting therefrom which is designed for reception in a female seat 125c formed in the tubular leg 125a. In a somewhat similar manner, the leg 125b has a continuous male lip 125d designed for reception in a female seat 127d formed in the tubular leg 127b. Because of the overlapping or telescoping relationship of the legs on the parts 125 and 127, adequate insulation is provided for the winding 47 throughout its passage through the magnetic structure 45. The exposed ends of the parts 125 and 127 are open to facilitate the winding of the coil 47 therein. However, as clearly shown in the drawings, the parts 125 and 127 are configured to introduce adequate insulation between the fixed winding 47 and adjacent portions of the magnetic structure 47. The parts 125 and 127 conveniently may be molded from an insulating material, such as a phenolic resin.

In Fig. 22, a complete two-element electrodynamic instrument is disclosed which is extremely easy to assemble and service. In this instrument a supporting structure 129 is divided into two separable parts 129a and 129b. These parts are attached in any suitable manner as by means of machine screws 131, one of which is shown in Fig. 22. It will be noted that the part 129 has an extension 133 overlapping a portion of the part 129a and that the extension 133 is provided with a separate opening 135 through which each of the machine screws 131 passes. By removing the machine screws 131, the part 129a may be detached from the part 129b. The supporting structure 129 is secured to a mount 129c which may be in the form of a panel by means of insulating posts 129d which may be formed of a phenolic resin. Each post has a stud 129e in threaded engagement with the supporting structure 129 and a stud 129f suitably secured to the mount 129c, as by a nut 129g. The studs 129e and 129f are insulated from each other. Consequently, the entire instrument is insulated from the mount 129c.

The parts 129a and 129b have, respectively, arms 137a and 137b which have secured thereto internally-threaded bushings 139a and 139b in any suitable manner as by means of machine screws 141. Bearing screws 143a and 143b are in threaded engagement respectively with the bushings 139a and 139b.

The bearing screws are employed for mounting a rotor assembly 145 for rotation with respect to the supporting structure. The rotor assembly includes a shaft 147 having an opening 149 at one end for receiving a bearing 151. The bearing screw 143a has a pin 153 projecting therefrom for reception in the bearing 151. At its remaining end, the shaft 147 has projecting therefrom a pivot 154 which is received in a suitable bearing mounted in the bearing screw 143b.

The rotor assembly 145 is provided with two coil assemblies 155 and 157. These coil assemblies form portions respectively of the two elements 159 and 161 of the electro-dynamic instrument. Although the coil assemblies 155 and 157 each may be similar to the coil 3 of Figs. 16 and 17, for the reasons hereinafter set forth each of the coil assemblies 155 and 157 employs the two coils 50 and 52 which have been previously discussed. The coils 50 and 52 may be secured to the shaft 147 for rotation therewith in any suitable manner. For example, the coil assembly 155 includes two channels 163 and 165 which have secured thereto bushings 163a and 165a. These bushings are firmly secured to the shaft 147 as by establishing a press fit therebetween. Although the bushings may be constructed of metal, if additional insulation between the coils is desired, the bushings may be constructed from insulating material such as a phenolic resin. The channels 163 and 165 are proportioned to receive portions of the ends of the coils 50 and 52 and are bent around the coils to secure the coils firmly in position. If desired, adhesive may be employed between the coils 50 and 52 and their associated channels 163 and 165.

The shaft 147 also has secured thereto a collar 167 to which a spring arm 169 is attached. The collar 167 may be secured in position by means of a set screw 171. A damping disk or armature 173 is mounted on the shaft 147 to form a part of the rotor assembly. This armature may be formed of a suitable electroconductive material, such as aluminum or copper.

In order to establish connections between external circuits and the coils 50 and 52, a terminal assembly 175 is secured to the shaft 147. To facilitate construction and servicing operations, the terminal assembly is mounted on a metallic sleeve 177 which has a shoulder 179 at one end thereof. This shoulder has associated therewith a set screw 181 by means of which the entire terminal assembly is detachably secured to the shaft 147. If desired, the shaft 147 may have a groove 183 formed therein for reception of the set screw 181. This groove eliminates difficulty in removal of parts due to burrs formed on the shaft by the set screw.

The terminal assembly 175 includes six collars 185 which surround the sleeve 177 and which are well nested within each other. For example, the top collar 185 has a recess 185a within which a lip 185b formed on the adjacent collar projects. By this construction, the collars form a complete layer of insulation over the sleeve 177. Conveniently, the collars may be molded from an insulating material such as a phenolic resin. It will be noted that the shoulder 179 carries a pin 187 which is received in a notch in the adjacent collar 185 to locate the collar angularly with respect to the sleeve 177.

A separate mica barrier 189 is positioned between each pair of collars 185. Between each pair of mica barriers a separate flexible spiral conductor strip 191, 193, 195 or 197 is positioned. Each of these conductor strips has its inner end attached to a holder which also is secured between an adjacent pair of collars 185. For example, the inner end of the conductor strip 191 is soldered to a lug 199 projecting from a holder 201. This holder, together with the adjacent mica barrier, is securely clamped between the two upper collars 185. The holder 201 also has a lead passing through an insulating tube 203 for establishing a connection to a lead 205 from one of the coils. In a similar manner, the remaining conductor strips are attached to other coil leads.

The outer end of each conductor strip is soldered to a lug which is mounted on an insulation block 207. The insulation block is secured in any suitable manner to the part 129b of the supporting structure. For example, the outer end of the conductor strip 191 is soldered to a lug 191a. In a similar manner, the outer ends of the conductor strip 193, 195 and 197 are connected respectively to lugs 193a, 195a and 197a. The lugs, in turn, may be connected to any external circuit as desired.

In constructing the terminal assembly, the collars, mica barriers, conductor strips and holders are successively slid over the sleeve 177 in the order indicated in Fig. 22. The upper end of the sleeve 177, as viewed in Fig. 22, then is flared or spun over the upper collar to secure the parts of the terminal assembly to each other. Thereafter, the terminal assembly may be handled as a unit for attachment or removal with respect to the shaft 147. The relationship of the collars, barriers, conductor strips and holders may be substantially similar to that described in the copending application of D. A. Young et al. Serial No. 500,896, filed September 2, 1943, which issued as Patent 2,438,027 on March 16, 1948.

A collar 209 is removably attached to the shaft 147 by any suitable means, such as a removable pin 211 which passes through the shaft and collar. This collar may support a pen arm 213. It should be noted that to remove the pen arm, it is only necessary to remove the machine screw 131, thereby permitting the part 129a to be separated from the part 129b of the supporting structure. The bearing 151 and the collar 209 then may be removed from the shaft. This servicing operation does not necessitate any cutting or unsoldering of electrical connections.

The coil assemblies 155 and 157 have associated therewith magnetic structures 215 and 217 which may be similar in construction to the magnetic structure 45 of Figs. 16 and 17. However, in Fig. 22 the insulating parts 125 and 127 are illustrated for the fixed windings associated with the magnetic structures 215 and 217. The magnetic structures 215 and 217 are secured in any suitable manner to a bracket 219 projecting from the part 129b as by means of machine screws (not shown). Desirably, the magnetic structures may be electrically insulated from the bracket 219, as represented by insulation 219a. A suitable structure for this purpose is shown in the aforesaid Young et al. application. The air gaps in which the coils are located may provide adequate insulation between the coil assemblies 155 and 157, but in some cases the additional insulation 219a may be desirable in the path represented by the magnetic structures and the bracket.

Damping flux for the armature 173 is provided by a pair of permanent magnets 221 and 223 which are spaced to define an air gap through which a portion of the armature 173 rotates. The damping magnets are secured to a post 225 which has a stud 227 projecting through an opening in a bracket 229 secured to the part 129b of the supporting structure. A nut 228 cooperates with the stud 227 to secure the post 225 to the bracket 229.

The construction of the damping magnet assembly is shown more clearly in Fig. 23. Referring to Fig. 23, it will be noted that the permanent magnets 221 and 223 are suitably secured to a plate 231 of nonmagnetic material, such as brass. For example, the permanent magnets may be brazed to the plate 231. The polarities of the permanent magnets may be those indicated in Fig. 23 by the polarity markings N (north pole) and S (south pole). It will be noted that the plate 231 has an opening 233 through which a portion of the armature 173 projects (see Fig. 22).

As shown in Fig. 23, the post 225 has a stud 235 projecting therefrom through an opening in the plate 231. This stud 235 has nuts 237 and 239 positioned on opposite sides of the plate 231. By proper manipulation of the nuts 237 and 239, the plate 231 may be secured to the stud 235 at various positions in order to adjust the distance between the permanent magnets and the shaft 147. Such adjustment is effective for adjusting the damping torque applied by the permanent magnets to the rotor assembly. Additional support for the plate 231 is provided by the sleeve 241 which is secured to the plate 231 and which extends in a direction parallel to the stud 235. This sleeve 241 is proportioned to receive slidably a guide rod 243 which is secured to the bracket 225. It should be noted that by release of the nut 239, the plate 231 may be removed completely from the remainder of the instrument.

To remove the rotor assembly from the remainder of the instrument illustrated in Fig. 22, the set screw 171 may be released to permit the shaft 147 to pass through the collar 167 during subsequent operations. The machine screws 131 then are withdrawn and the part 129a of the supporting structure is removed from the part 129b. If desired at this stage, the bearing 151 and the collar 209 may be removed from the shaft 147. The nut 239 also is removed from its associated stud 235 and the plate 231, together with the permanent magnets mounted thereon, is removed from the remainder of the instrument.

The outer ends of the conductor strips 191, 193, 195 and 197 are next detached from their associated lugs 191a, 193a, 195a and 197a. This completely frees the rotor assembly for removal from the remainder of the instrument. Since the magnetic structures 215 and 217 are similar to the magnetic structure 45 of Figs. 16 and 17 and the magnetic structures 85 and 93 of Fig. 18, they provide continuous passages through which the coil assemblies may be moved during withdrawal of the rotor assembly from the remainder of the instrument. This withdrawal is effected in exactly the same manner required for the rotor assembly of Fig. 18. For this reason, a detailed discussion of the angular and axial movements of the rotor assembly during withdrawal is believed unnecessary at this time. It is to be understood that the bracket 219 provides adequate clearance for rotation of the coil assemblies during their withdrawal from their associated magnetic structures. The reverse of the above procedure may be followed for reassembling the instrument.

The arm 169 may be clamped to the outer end of a spiral control spring 247 in any suitable manner. As shown in Fig. 22, the arm 169 has has a portion 249 extending parallel to the shaft 147. The portion 249 has an opening through which a machine screw 251 passes into threaded engagement with a strip 253. The strip 253 extends through an opening 255 in the arm 169. By manipulation of the screw 251, the outer end of the control spring 247 may be detachably clamped between the portion 249 and the strip 253, as shown in Fig. 22.

The inner end of the spiral control spring 247 is secured in any suitable manner to a holder 257 which is secured to the bushing 139b. It will be noted that the bushing 139b has a groove formed therein to provide a section 259 of reduced diameter. The holder 257, as more clearly shown in Fig. 24, has a recess 261 formed in its lower face. This recess has a diameter substantially equal to the diameter of the bushing 139b below the portion 259. In addition, the holder 257 has a channel 263 cut therein. This channel has a width substantially equal to the diameter of the section 259 of the bushing. Furthermore, the holder 257 has a thickness slightly less than the thickness of the groove provided in the bushing 139b. To remove the holder 257 from the bushing 139b, the holder is raised slightly as viewed in Fig. 22. The holder then may be withdrawn to the right, completely clear of the bushing. To reinsert the holder in mounted position, a reverse procedure is followed. The holder 257 is urged in a downward direction by means of a spring washer 265 which biases in a downward direction a washer 267. The washer 267 engages the holder 257 to urge the lower portion of the bushing 139b into the recess 261. If desired, a handle 269 may be attached to the washer 267 for the purpose of rotating the holder 257. The engaging surfaces of the washer 267 and the holder 257 may be roughened or knurled to assure firm engagement therebetween during rotation of the washer 267. Manipulation of the handle 269 may be employed for adjusting the rotor assembly to the position it should occupy when the instrument is deenergized. The holder 257 may be placed in its approximate correct position by manual rotation thereof with respect to the washer 267. It should be noted that by releasing the screw 251, the control spring 247 may be removed for repair or replacement without disturbing the remainder of the instrument.

The provision of two coils 50 and 52 in each of the elements provides an extremely flexible instrument. For example, the coils in each of the elements may be connected in accordance with the teachings of Fig. 12 and the fixed windings in each of the elements then may be connected in series in accordance with the teachings of Fig. 8. As previously explained, the resulting instrument is substantially astatic in operation.

Although Figs. 16, 17, 18 and 22 illustrate preferred embodiments of the invention, it is possible to connect sets of pole pieces embodying the invention in other practical ways. For example, in Fig. 25 an electrodynamic instrument is disclosed which corresponds to the instrument illustrated schematically in Fig. 3. In Fig. 25 a pair of outer pole pieces 275 and 277 are disclosed which correspond to the pole pieces 4 and 6 of Fig. 3. In addition, a pair of inner pole pieces 279 and 281 are disclosed which correspond to the inner pole pieces 38 and 40 of Fig. 3. The outer pole pieces 275 and 277 are connected by a magnetic conductor 283 which corresponds to the magnetic conductor 12 of Fig. 3. The inner pole pieces 279 and 281 are connected by a magnetic conductor 285 which corresponds to the magnetic conductor 42 of Fig. 3.

When the winding 14 which surrounds the magnetic conductor 283 in Fig. 25 is energized to produce a flow of magnetic flux as illustrated by the arrow $\phi$, the magnetic flux flows from the pole piece 277 through the air gap to the inner pole piece 281, through the magnetic conductor 285 and the pole piece 279, across the air gap to the outer pole piece 275 and through the magnetic conductor 283 back to the pole piece 277.

The inner pole pieces 279 and 281, together with the magnetic conductor 285 form a magnetic section 287 which, if employed alone, produces a substantial solenoid action with respect to the coil 16 associated therewith. To eliminate substantially this solenoid action, a second magnetic section 289 is employed which is similar in construction to the magnetic section 287. However, the magnetic section 289 is reversed relative to the magnetic section 287 about an axis transverse to the axis of rotation of the coil 16. For the reasons set forth in the discussion of Fig. 16, the provision of the two sections 287 and 289 substantially eliminates solenoid action.

Conveniently, the outer pole pieces 275 and 277, together with the magnetic conductor 283 may be machined from a suitable soft magnetic material such as soft steel. The magnetic sections 287 and 289 may be formed of a plurality of laminations which are attached to each other in any suitable manner as by means of rivets 291. The magnetic sections 287 and 289 are spaced apart by means of a suitable spacer 293 which may be formed of magnetic or nonmagnetic material, as desired. The sections 287 and 289, together with the spacer 293, may be riveted to a supporting plate 295 of nonmagnetic material such as brass which, in turn, is suitably attached to the pole piece 275 as by brazing. Since the magnetic sections 287 and 289 are spaced apart by a distance sufficient to permit rotation of a side of the coil 16 therebetween, the coil 16, together with its shaft, may be removed from the magnetic structure of Fig. 25 without disturbing the magnetic structure in any way. The procedure for removing the coil 16 is similar to that employed for removing the coil 3 from the magnetic structure illustrated in Figs. 16 and 17. For this reason, a further discussion of such removal is believed to be unnecessary.

In Fig. 26, an electrodynamic instrument is disclosed which corresponds to the instrument schematically shown in Fig. 4. As shown in Fig. 26, a pair of outer pole pieces 297 and 299 correspond to the pole pieces 4 and 6 of Fig. 4, and form part of an upper magnetic section 309. A pair of inner pole pieces 301 and 303 correspond to the pole pieces 38 and 40 of Fig. 4. The outer pole piece 297 is connected to the inner pole piece 303 by means of a magnetic conductor 305. The outer pole piece 299 is connected to the inner pole piece 301 by means of a magnetic conductor 307. When the winding 14 is energized to produce magnetic flux in the direction represented by the arrow $\phi$, the flux flows in series through the magnetic conductor 305, the inner pole piece 303, the outer pole piece 299, the inner pole piece 301 and the outer pole piece 297, which constitute parts of the upper magnetic section 309. Because of the directions of flow of flux, the two coils 50 and 52 are employed in the modification of Fig. 26.

In order to eliminate solenoid action, a second magnetic section 311 is provided which is similar in construction to the upper magnetic section 309. However, the magnetic section 311 is reversed relative to the magnetic section 309 about an axis transverse to the axis of rotation of the coils 50 and 52. In Fig. 26, the coil 14 surrounds both of the magnetic conductors 305 associated with the two magnetic sections. Conveniently, in each magnetic section the pole pieces 297 and 303, together with the magnetic conductor 305, may be formed of integral magnetic laminations of soft iron which are attached to each other by means of rivets 315. In a similar manner, in each magnetic section the pole pieces 299 and 301, together with the magnetic conductor 307, may be formed of soft magnetic laminations which are united by means of rivets 317. The two magnetic sections 309 and 311 may be secured in any suitable way to a nonmagnetic support 313.

By inspection of Fig. 26, it will be noted that the magnetic sections 309 and 311 are spaced apart by a distance sufficient to permit rotation of a side of each of the coils 50 and 52 therebetween. Consequently, the coils 50 and 52, together with their shaft, may be removed from the magnetic sections without disturbing the magnetic sections in any way. The procedure for removing the coils is similar to that discussed for Figs. 16 and 17.

Fig. 27 shows an electrodynamic instrument which corresponds to the instrument shown schematically in Fig. 5. In Fig. 27, an upper magnetic section 327 includes an inner magnetic pole piece 319 and an outer pole piece 320 both connected to one end of a magnetic conductor 321. An inner magnetic pole piece 323 and an outer magnetic pole piece 325 are connected to the remaining end of the magnetic conductor 321 which corresponds to the magnetic conductor 62 of Fig. 5. The pole pieces 319, 320, 323 and 325 of Fig. 27 correspond to the pole pieces 48, 4, 38, and 6 of Fig. 5. When the coil 14, which surrounds the magnetic conductor 321, is energized to produce a flow of magnetic flux in the direction represented by the arrow $\phi$ the flux passes from the pole pieces 323 and 325, respectively, to the pole pieces 320 and 319. As explained with reference to Fig. 5, the coil 16 may be employed in an instrument of the type illustrated in Fig. 27.

The upper magnetic section 327 which is composed of the pole pieces 319, 320, 323 and 325, together with the magnetic conductor 321, conveniently may be formed of a plurality of integral magnetic laminations of soft iron which are attached to each other by means of rivets 329. To eliminate the solenoid action produced by the magnetic section 327, an additional magnetic section 331 is employed which is similar to the magnetic section 327. However, the lower magnetic section 331 is reversed with respect to the magnetic section 327 about an axis transverse to the axis of rotation of the coil 16. It will be noted that the coil 14 surrounds the magnetic conductors 321 of both of the magnetic sections.

A spacer 333 of magnetic or nonmagnetic material is interposed between the magnetic sections 327 and 331 to space them apart for a distance sufficient to permit rotation of a side of the coil 16 therebetween. By inspection of Fig. 27, it will be observed that the coil 16 can be removed from the associated magnetic sections without disturbing the magnetic sections in any way by following the procedure discussed with reference to Figs. 16 and 17. It is to be understood that the coils 16 of Figs. 25 and 27 and the coils 50 and 52 of Fig. 26 have sufficient length to surround the inner pole pieces of both associated magnetic sections.

In Fig. 28, an electrodynamic instrument is disclosed which corresponds to the instruments schematically shown in Fig. 6. The instrument of Fig. 28 includes a pair of outer magnetic pole pieces 335 and 337 which correspond to the pole pieces 4 and 6 of Fig. 6. In addition, Fig. 28 shows an upper magnetic section 369 providing a pair of inner magnetic pole pieces 339 and 341 which correspond to the inner pole pieces 38 and 48 of Fig. 6. The inner magnetic pole pieces 339 and 341 are connected to one end of a magnetic conductor 343 which corresponds to the magnetic conductor 68 of Fig. 6. The outer magnetic pole pieces 335 and 337 are connected to the remaining end of the magnetic conductor 343. The coils 50 and 52 in Fig. 28 are attached to a shaft 345 which also carries flexible spiral conductor strips 347 and 349 and a spiral control spring 351. A pointer or pen arm 353 also may be mounted on the shaft 345.

The outer magnetic pole pieces 335 and 337 are connected by a magnetic conductor 355 which corresponds to the magnetic conductors 74 and 76 of Fig. 6. The remaining ends of the pole pieces 335 and 337 may be connected by a bridging plate 357 of magnetic or nonmagnetic material which is detachably secured to the pole pieces by means of machine screws 359. The plate 357 and the magnetic conductor 355 have threaded openings passing therethrough for receiving bearing screws 361 and 363.

The inner ends of the conductor strips 347 and 349 are secured to insulating bushings mounted on the shaft 345. They are also connected to the coils 50 and 52 in a manner such as that illustrated in Fig. 12. The outer ends of the conductor strips may be secured to the outer pole pieces in any suitable manner. For example, the outer end of the conductor strips 349 is secured to an insulating block 365 which, in turn, is secured to the pole piece 335. The outer end of the control spring 351 may be connected to a post 367 which, in turn, is secured to the pole piece structure in any suitable manner. When the coil 14 which surrounds the magnetic conductor 343 is energized to produce a direction of flux flow similar to that represented by the arrows $\phi$, magnetic flux flows from the magnetic conductor 343 in parallel through the air gaps between the inner and outer pole pieces. The inner pole pieces 339 and 341, together with magnetic conductor 343, forming the upper magnetic section 369 may be constructed from a plurality of laminations of soft magnetic material such as soft iron which are attached to each other by means of rivets 370.

In order to eliminate solenoid action, a second magnetic section 371 is provided which is similar in construction to the magnetic section 369. The magnetic section 371 is reversed with respect to the magnetic section 369 about an axis transverse to the shaft 345 and parallel to the magnetic conductor 343. The magnetic sections 369 and 371 are spaced apart by means of a spacer 373 for a distance sufficient to permit rotation of a side of each of the coils 50 and 52 therebetween. It is to be understood that the coil 14 surrounds the magnetic conductors 343 of both of the magnetic sections 369 and 371.

In order to remove the coils 50 and 52 from the associated magnetic structure, the ends of the conductor strips 347 and 349 are released from their associated pole pieces. In addition, the outer end of the spiral control spring 351 is detached from the post 367. Next the screws 359 are removed and the bridge plate 357 also is removed from the pole pieces.

The rotor assembly now is rotated in a counter-clockwise direction (looking at the control-spring end of the shaft 345) until the coils 50 and 52 are aligned with the passage between the inner pole pieces of the magnetic section 371. The entire rotor assembly then is raised until the lower ends of the coils 50 and 52 are adjacent the magnetic section 369. The rotor assembly next is rotated in a clockwise direction until the coils 50 and 52 are aligned with the passage between the inner pole pieces of the magnetic section 369. During this rotation the lower ends of the coils rotate between the magnetic sections 369 and 371. Finally the rotor assembly is raised to pass the coils through the passage between the inner pole pieces of the magnetic section 369. The rotor assembly now is completely free of its associated magnetic structure. By following a reverse procedure, the instrument may be reassembled.

Although the invention has been described with reference to certain specific embodiments thereof, numerous modifications are possible. Therefore, the invention is to be restricted only by the appended claims as interpreted in view of the prior art.

I claim as my invention:

1. In an electrical instrument, a magnetic structure having an air gap, a coil positioned in said air gap, and means mounting said coil for rotation relative to said magnetic structure, said magnetic structure extending through said coil to establish magnetic paths for directing magnetic flux through two sides of the coil, and said magnetic structure being configured to provide a passage through which said coil may be withdrawn from operative position relative to the magnetic structure to a position external to said magnetic structure, said magnetic structure including a pair of magnetic-flux-producing means, each independently effective for directing magnetic flux through a separate one of the coil sides.

2. In an electrical instrument, a unitary magnetic structure, coil means, and means mounting said coil means for rotation about an axis relative to said magnetic structure, said coil means comprising two coils angularly spaced about the axis of rotation, the coils respectively having two sides spaced substantially from the axis of rotation thereof, said magnetic structure comprising portions extending through said coils to define with the remainder of said magnetic structure a separate air gap for each of said two sides of said coils, and a separate source of magnetomotive force for establishing a separate magnetic field in each of the air gaps.

3. In an electrical instrument, a magnetic structure, a coil, a continuous shaft supporting said coil for rotation about the axis of the shaft, and means mounting said coil and shaft for rotation relative to said magnetic structure, said coil having two sides spaced substantially from the axis of rotation thereof, said magnetic structure comprising portions extending through said coil on opposite sides of said shaft to define with the remainder of said magnetic structure a separate air gap for each of said two sides of said coil, the magnetic structure including two magnetic-flux-producing means each independently effective for directing magnetic flux through a separate one of the air gaps.

4. In an electrical instrument, a magnetic structure, coil means, and means mounting said coil means for rotation relative to said magnetic structure, the coil means comprising two coils angularly spaced about the axis of rotation, said magnetic structure comprising a first magnetic portion defining a first magnetic path having an air gap within which a side of a first one of said coils is positioned for movement, and a second magnetic portion defining a second magnetic path having an air gap within which a side of a second one of said coils is positioned for movement, said portions being spaced to define a passage communicating with said air gaps through which said coil may be removed from operative position relative to said magnetic structure, the magnetic structure including magnetic-flux-producing means for directing magnetic flux in opposite directions through the air gaps.

5. In an electrical instrument, coil means, a magnetic structure, means mounting said coil means for rotation relative to said magnetic structure about an axis, said coil means including a pair of coil sides spaced angularly about said axis and positioned substantially at the same distance from any point on said axis, said magnetic structure having a separate air gap for receiving each of said coil sides, and the magnetic structure having a passage extending between said air gaps through the position occupied by said axis, and separate magnetomotive-force-producing means independently effective for establishing a separate magnetic field in each of said air gaps, the total value of the magnetic flux in the two magnetic fields being substantially equal to the total magnetic flux produced by the separate means, said passage being proportioned to permit movement therethrough of said coil means from a position external to said magnetic structure in a substantially linear direction to a position wherein said coil sides may be rotated substantially about said axis through said air gaps.

6. In an electrical instrument, coil means, a magnetic structure, means mounting said coil means for rotation relative to said magnetic structure about an axis, said coil means including a pair of coil sides substantially equidistant from one end of the coil means and spaced angularly about the axis, said magnetic structure including first and second magnetic inner pole pieces disposed between the coil sides, first magnetic means spaced from said first magnetic inner pole piece to define therewith a first air gap within which a first one of the coil sides is disposed for rotation, second magnetic means spaced from said second magnetic inner pole piece to define therewith a second air gap within which a second one of the coil sides is disposed for rotation, the coil means being rotatable from a first position wherein said coil sides are disposed within their respective air gaps to an intermediate position wherein said coil sides are external to the air gaps, said inner pole pieces being spaced to define a passage permitting movement therethrough of said coil means from the intermediate position to a position external to said magnetic structure, and magnetic means extending between said inner pole pieces by a path external to said air gaps and said passage, said magnetic structure including two magneticflux-producing means for producing magnetic fields in said air gaps, each of the magnetic-flux-producing means being effective when independently energized for establishing a magnetic field in a separate one of the air gaps.

7. In an electrical instrument, coil means, a magnetic structure, means mounting said coil means for rotation relative to said magnetic structure about an axis, said coil means including a pair of coil sides spaced angularly about said axis and positioned substantially at the same distance from any point on said axis, said magnetic structure having a separate air gap for receiving each of said coil sides, and means for directing magnetic flux in opposite directions through said air gaps, said coil means including means connecting said coil sides for energization in directions conferring substantial immunity against external field influence on said instrument.

8. In an electrical instrument, coil means, a magnetic structure, means mounting said coil means for rotation about an axis relative to said magnetic structure, said coil means comprising a pair of coils spaced angularly about said axis and positioned substantially at the same distance from any point on the axis, said magnetic structure having a separate air gap for each of said coils, and means for directing magnetic flux in opposite directions through said air gaps, and means connecting said coils for energization from a single source of electrical energy to apply cumulative torques to said shaft, whereby substantial immunity against external field influence is conferred on said instrument.

9. In an electrical instrument, coil means, a magnetic structure, means mounting said coil means for rotation about an axis relative to said magnetic structure, said coil means comprising a pair of coils spaced angularly about said axis and positioned substantially at the same distance from any point on the axis, said magnetic structure having a separate air gap for each of said coils, and separate means for directing magnetic flux through each of said air gaps.

10. In an electrical instrument, a magnetic structure, a pair of windings, coil means, means mounting said coil means for rotation about an axis with respect to said magnetic structure, said magnetic structure comprising a pair of pole pieces positioned on opposite sides of said axis, each of said pole pieces projecting through a separate one of the windings and having a pole face adjacent the path of travel of a separate side of said coil means, a pair of magnetic cores projecting through said coil means on opposite sides of said axis, and a magnetic body connecting said pole pieces to one end of each of said magnetic cores, said ends of said magnetic cores being disposed on opposite sides of said axis, whereby each of said pole pieces cooperates with a separate one of said magnetic cores to complete a magnetic path having an air gap within which a separate side of said coil means is disposed for movement, said magnetic cores being spaced in a direction transverse to said axis to define a passage through which said coil means may be removed from operative position relative to said magnetic structure, each of said windings when independently energized cooperating with the pole piece therein to direct substantially the entire magnetic flux produced by the winding through the pole face of the pole piece therein.

11. In an electrical instrument, a magnetic structure including a substantially cylindrical magnetic core, a magnetic body substantially surrounding said magnetic core, said magnetic body having a pair of pole pieces spaced from said magnetic core and spaced angularly about the axis of said magnetic core to form therewith a pair of susbtantially annular air gaps, said magnetic core having a passage extending completely therethrough intermediate said air gaps to divide said magnetic core into two portions each adjacent a separate one of said pole pieces, said magnetic structure including separate magnetic means displaced from said air gaps for connecting each of said magnetic portions to said magnetic body to define a pair of magnetic paths each including a separate one of said pole pieces and a separate one of said magnetic portions, coil means proportioned for movement from a position external to said magnetic structure through said passage to a position embracing said magnetic core with coil sides located in said air gaps, means mounting said coil means for rotation relative to said magnetic structure, and separate means independently effective for directing magnetic flux through each of said magnetic paths.

12. A unitary magnetic structure for an electrical measuring instrument, said magnetic structure including a substantially cylindrical magnetic core, a magnetic body substantially surrounding said magnetic core, said magnetic body having a pair of pole pieces spaced from said magnetic core to form therewith a pair of substantially annular air gaps, said magnetic core having a passage extending completely therethrough to divide said magnetic core into two portions angularly spaced about the axis of said magnetic core, said magnetic structure including separate magnetic means connecting each of said magnetic portions to said magnetic body, and a separate winding surrounding each of said pole pieces for directing, when independently energized, magnetic flux into the associated air gap.

13. In an electrical instrument, coil means designed for rotation about an axis intermediate two sides thereof, said sides being positioned substantially equidistant from any of a plurality of points spaced along the axis, a magnetic structure, means mounting said coil means for rotation relative to said magnetic structure about said axis, said magnetic structure comprising a pair of magnetic parts each defining paths for magnetic flux produced by current flowing in said coil means, each of said magnetic parts being configured to provide a substantial force acting between the magnetic part and said coil means in response to current flowing in said coil means, and means reversely mounting said magnetic parts to direct said forces acting on the coil means in opposition to each other, whereby movement of said coil means is substantially unaffected by said forces.

14. In an electrical instrument, a magnetic structure, coil means designed for rotation about an axis intermediate two sides of the coil means, said sides being positioned substantially equidistant from any of a plurality of points spaced along the axis, and means mounting said coil means for rotation with respect to said magnetic structure about said axis, said magnetic structure comprising a pair of magnetic parts each having an air gap for each of said two sides of said coil means, each of said magnetic parts defining magnetic paths for magnetic flux produced by current flowing in said coil means which are asymmetric with respect to the path of travel of said coil means, and means reversely mounting said magnetic parts with their asymmetries oppositely associated with said coil means to provide resultant magnetic paths linking each of said coil sides which are substantially symmetric with respect to the paths of travel of the associated coil sides.

15. In an electrical instrument, a magnetic structure, coil means substantially symmetric about an axis, and means mounting said coil means for rotation with respect to said magnetic structure about said axis, said magnetic structure comprising a pair of unitary magnetic parts each having an air gap for each of two sides of said coil means, each of said magnetic parts defining magnetic paths for magnetic flux produced by current flowing in said coil means which are asymmetric with respect to the path of travel of said coil, and means mounting said magnetic parts with their asymmetries oppositely associated with said coil means to provide resultant magnetic paths linking each of said coil sides which are substantially symmetric with respect to the path of travel of the associated coil side, and separate means for directing magnetic flux through each of said resultant magnetic paths.

16. In an electromagnetic device, a magnetic structure having inner and outer pole piece structures defining arcuate air gaps substantially symmetrically disposed relative to an axis, means associated with said magnetic structure for producing a magnetic field in said air gaps, coil means, and means mounting said coil means with a separate coil side positioned in each of said air gaps for movement therethrough about said axis; said inner pole piece structure comprising a pair of first magnetic cores extending through said coil means, said first magnetic cores being asymmetric with respect to the path of movement of said coil means to produce a first force acting on said coil means when electrical current flows through the coil means, and a pair of second magnetic cores extending through said coil means, said second magnetic cores being positioned asymmetrically with respect to the path of movement of said coil means and reversely relative to the first magnetic cores to produce a second force acting on said coil means in opposition to said first force when electrical current flows through the coil means, said magnetic cores being configured to define a passage extending through said inner pole piece structure to permit insertion and removal of said coil means therethrough relative to said magnetic structure.

17. In an electrical instrument, a magnetic structure, coil means, and means mounting said coil means for rotation relative to said magnetic structure about an axis, said axis being located intermediate two sides of said coil means, said magnetic structure comprising a pair of magnetic cores each having a separate part positioned between said axis and each of said sides of said coil means, a first one of said magnetic cores having a passage permitting movement of said coil means therethrough in a direction substantially parallel to said axis when said coil means is adjacent a first extreme of its path of rotation, and a second one of said magnetic cores having a passage permitting movement of said coil means therethrough in a direction substantially parallel to said axis when said coil means is adjacent a second extreme of its path of rotation.

18. In an electrical instrument, a magnetic structure, coil means, and means mounting said coil means for rotation relative to said magnetic structure about an axis, said axis being located intermediate two sides of said coil means, said magnetic structure comprising a pair of magnetic cores each having a separate part positioned between said axis and each of said sides of said coil means, a first one of said magnetic cores having a passage permitting movement of said coil means therethrough in a direction substantially parallel to said axis when said coil means is adjacent a first extreme of its path of rotation, and a second one of said magnetic cores having a passage permitting movement of said coil means therethrough in a direction substantially parallel to said axis when said coil means is adjacent a second extreme of its path of rotation, and said magnetic cores being spaced in a direction parallel to said axis sufficiently to permit movement of a side of said coil means therebetween.

19. In an electrical instrument, coil means, a magnetic structure, means mounting said coil means for rotation with respect to said magnetic structure about an axis, said axis being located intermediate a pair of sides of said coil means, said magnetic structure comprising four magnetic cores extending through said coil means, said magnetic cores being arranged in pairs located on opposite sides of said axis and spaced to permit movement of said coil means therebetween, and magnetic means connected only to one end of each of said magnetic cores, said magnetic means being connected to opposite ends of the magnetic cores in each of said pairs, said magnetic cores being so positioned that a side of said coil means simultaneously moves away from said one end of a first one of the magnetic cores passing through the coil means and towards said one end of a second one of the magnetic cores passing through the coil means.

20. In an electrical instrument, coil means, a magnetic structure, means mounting said coil means for rotation with respect to said magnetic structure about an axis, said axis being located intermediate a pair of sides of said coil means, said magnetic structure comprising four magnetic cores extending through said coil means, said magnetic cores being arranged in pairs located on opposite sides of said axis and spaced to permit movement of said coil means therebetween, the magnetic cores in each of said pairs being spaced along said axis for a distance sufficient to permit movement of a side of said coil means therebetween.

21. In an electrical instrument, coil means; a plurality of substantially similar magnetic laminations each having a magnetic body and a pair of spaced, cantilever magnetic cores projecting in opposite directions from said body through said coil means; and means mounting said coil means for rotation about an axis passing between the magnetic cores of each of said laminations, at least one of said magnetic laminations being reversed about a line transverse to said axis with respect to the remainder of said magnetic laminations.

22. In an electrical instrument; coil means; a plurality of substantially similar magnetic laminations each having a magnetic body and a pair of spaced, cantilever magnetic cores projecting in opposite directions from said body through said coil means; and means mounting said coil means for rotation about an axis passing between the magnetic cores of each of said laminations, the free ends of said magnetic cores being spaced from said magnetic body to provide access for said coil means to the passage between said cores through which said coil means may be passed in a direction substantially parallel to said axis, at least one of said magnetic laminations being reversed about a line transverse to said axis with respect to the remainder of said magnetic laminations, said reversely related laminations being spaced in a direction parallel to said axis sufficiently to permit passage of a side of said coil means therebetween.

23. In an electrical instrument; coil means; a plurality of substantially similar magnetic laminations each having a magnetic body and a pair of spaced, cantilever magnetic cores projecting in opposite directions from said body through said coil means, and a separate magnetic pole piece spaced from each of said magnetic cores to define with the associated magnetic core a magnetic path including an air gap, and means mounting said coil means for rotation about an axis passing between the magnetic cores of each of said laminations, said coil means having a separate coil side disposed for movement through each of the air gaps in each of said laminations, and separate means for directing magnetic flux through the magnetic paths associated with each of said coil sides, at least one of said magnetic laminations being reversed about a line transverse to said axis with respect to the remainder of said magnetic laminations.

24. In an electrical instrument; coil means; a plurality of substantially similar magnetic laminations each having a magnetic body, a pair of spaced, cantilever magnetic cores projecting in opposite directions from said body through said coil means and a separate magnetic pole piece spaced from each of said magnetic cores to define with the associated magnetic core a magnetic path including an air gap; and means mounting said coil means for rotation about an axis passing between the magnetic cores of each of said laminations, the free ends of said magnetic cores being spaced from said magnetic body to provide access for said coil means to the passage between said cores through which said coil means may be passed in a direction substantially parallel to said axis, said coil means having a separate coil side disposed for movement through each of the air gaps in each of said laminations, and separate means for directing magnetic flux through the magnetic paths associated with each of said coil sides, at least one of said magnetic laminations being reversed about a line transverse to said axis with respect to the remainder of said magnetic laminations, said reversely related laminations being spaced in a direction parallel to said axis sufficiently to permit passage of a side of said coil means therebetween.

25. In an electrical instrument; a pair of units; each of said units comprising a unitary magnetic structure and coil means; said magnetic structure having portions extending through said coil means to define with the remainder of said magnetic structure a separate air gap for each of two sides of said coil means; and each of the units including a source of magnetomotive force for the air gaps; and means mounting said coil means for rotation as a single assembly relative to said magnetic structures about an axis extending between said two sides of each of said coil means.

26. In an electrical instrument; a pair of units; each of said units comprising a unitary magnetic structure and coil means; said magnetic structure having portions extending through said coil means to define with the remainder of said magnetic structure a separate air gap for each of two sides of said coil means; and each of the units comprising a source of magnetomotive force for the air gaps; and means mounting said coil means for rotation as a single assembly relative to said magnetic structures about an axis extending between said two sides of each of said coil means, said magnetic structures having passages extending therethrough to permit withdrawal of said coil means as a single assembly through said passages from operative position relative to said magnetic structures to a position external thereto.

27. In an electrical instrument; a pair of aligned units; each of said units comprising a magnetic structure and coil means; said magnetic structure comprising a first magnetic portion defining a first magnetic path having an air gap within which a first side of said coil means is positioned for movement, and a second magnetic portion defining a second magnetic path having an air gap within which a second side of said coil means is positioned for movement, said portions being spaced to define a passage communicating with said air gaps through which said coil means may be removed from operative position relative to said magnetic structure; and each of the units comprising a source of magnetomotive force for the air gaps; and means mounting both of said coil means for rotation as a single assembly relative to said magnetic structures about an axis positioned between said sides of each of said coil means, one of said coil means being proportioned for movement through both of said passages, whereby said coils may be removed as a single assembly from operative position relative to said magnetic structures.

28. In an electrical instrument; a pair of units; each of said units comprising a unitary magnetic structure coil means; said coil means being adapted for rotation about an axis intermediate two sides of said coil means with respect to said magnetic structure; said magnetic structure comprising a pair of pole pieces positioned on opposite sides of said axis, each of said pole pieces having a pole face adjacent the path of travel of a separate side of said coil means, a pair of magnetic cores projecting through said coil means on opposite sides of said axis, and a magnetic body connecting said pole pieces to one end of each of said magnetic cores, said ends of said magnetic cores being disposed on opposite sides of said axis, whereby each of said pole pieces cooperates with a separate one of said magnetic cores to complete a magnetic path having an air gap within which a separate side of said coil means is disposed for movement, said magnetic cores being spaced in a direction transverse to said axis to define a passage through which said coil means may be removed from operative position relative to said magnetic structure; and each of the units comprising a source of magnetomotive force for the air gaps; means mounting said units with the axes of said coil means in alignment; and means mounting both of said coil means for rotation as a single assembly about said axes.

29. In an electrical instrument; a pair of units; each of said units comprising a magnetic structure including a substantially cylindrical magnetic core, a magnetic body substantially surrounding said magnetic core, said magnetic body having a pair of pole pieces spaced from each magnetic core and spaced angularly about the axis of said magnetic core to form therewith a pair of substantially annular air gaps, said magnetic core having a passage extending completely therethrough intermediate said air gaps to divide said magnetic core into two portions each adjacent a separate one of said pole pieces, said magnetic structure including separate magnetic means displaced from said air gaps for connecting each of said magnetic portions to said magnetic body to define a pair of magnetic paths each including a separate one of said pole pieces and a separate one of said magnetic portions, coil means proportioned for movement from a position external to said magnetic structure through said passage to a position embracing said magnetic core with coil sides located in said air gaps, and separate means independently effective for directing magnetic flux through each of said magnetic paths; and means mounting said coil means in alignment for rotation as a single assembly about said axis, a first one of said coil means normally associated with a first one of said magnetic structures being proportioned for movement successively through the passage of a second one of said magnetic structures and through the passage of the first one of said magnetic structures to a position wherein said first one of said coil means can embrace the magnetic core of said first one of said magnetic structures as said single assembly is moved from a position external to said magnetic structures to carry a second one of said coil means through the passage of the second one of said magnetic structures into position to embrace the magnetic core of the second one of said magnetic structures.

30. In an electrical instrument; a pair of units; each of said units including a coil, and a unitary magnetic structure comprising a magnetic body and a pair of cantilever magnetic cores projecting from said magnetic body in opposite directions through said coil, said magnetic cores being spaced to provide a passage permitting movement of said coil therethrough from a position external to said magnetic structure to a position embracing said magnetic cores; and means mounting said coils in alignment for rotation as a single assembly relative to said magnetic structures about an axis passing between the magnetic cores of each of said units, said coils being proportioned for simultaneous movement through the passages of their respective magnetic structures from operative positions relative to the magnetic structures to positions wherein one coil is between said magnetic structures, said one coil being also proportioned for movement through the passage of the magnetic structure normally associated with the other of said coils.

31. In an electrical instrument; a pair of units; each of said units comprising a magnetic structure, and coil means adapted for rotation about an axis located intermediate two sides of said coil means, said magnetic structure comprising a pair of magnetic cores each having a separate part positioned between said axis and each of said sides of said coil means, a first one of said magnetic cores having a passage permitting movement of said coil means therethrough in a direction substantially parallel to said axis when said coil means is adjacent a first extreme of its path of rotation, and a second one of said magnetic cores having a passage permitting movement of said coil means therethrough in a direction substantially parallel to said axis when said coil means is adjacent a second extreme of its path of rotation, and said magnetic cores being spaced in a direction parallel to said axis sufficiently to permit movement of a side of said coil means therebetween; and means mounting said coil means in alignment for rotation as a single assembly about said axis relative to said magnetic structures, said units being spaced along said axis sufficiently to permit withdrawal of said coil means as a single assembly through said passages from operative positions relative to said magnetic structures to positions external to said magnetic structures.

32. In an electrical instrument; a pair of units; each of said units comprising coil means, a plurality of substantially similar magnetic laminations each having a magnetic body, a pair of spaced, cantilever magnetic cores projecting in opposite directions from said body through said coil means, and a separate magnetic pole piece spaced from each of said magnetic cores to define with the associated magnetic core a magnetic path including an air gap, said coil means being adapted for rotation about an axis passing between the magnetic cores of each of said laminations, the free ends of said magnetic cores being spaced from said magnetic body to provide access for said coil means to the passage between said cores through which said coil means may be passed in a direction substantially parallel to said axis, said coil means having a separate coil side disposed for movement through each of the air gaps in each of said laminations, and separate means for directing magnetic flux through the magnetic paths associated with each of said coil sides, at least one of said magnetic laminations being reversed about a line transverse to said axis with respect to the remainder of said magnetic laminations, said reversely related laminations being spaced in a direction parallel to said axis sufficiently to permit passage of a side of said coil means therebetween; means mounting the laminations of the two units in alignment along said axis; and means mounting said coil means in alignment for rotation as a single assembly about said axis relative to said magnetic laminations with the coil sides in their respective air gaps, said coil means being spaced along said axis sufficiently and being proportioned to permit withdrawal of said coil means as a single assembly through said passages.

33. The method of mounting coil means symmetrically disposed on a shaft to embrace first and second cylindrical magnetic cores each having a diametric passage extending therethrough, which comprises axially spacing said magnetic cores on a common axis with the passages angularly spaced about said axis, aligning said coil means angularly about said axis to bring a diametric first side thereof in position to be advanced through the passage in said first magnetic core by movement of said coil means axially along said axis, moving said coil means axially along said axis until said first side is in the space between said magnetic cores, rotating said coil means about said axis to embrace said first magnetic core until said first side is in position to be advanced through the passage in said second magnetic core by movement of said coil means axially along said axis, moving said coil means axially along said axis until said coil means is in position to embrace both of said magnetic cores in response to rotation of said coil means about said axis, and mounting said coil means for rotation about said axis.

34. The method of mounting a coil assembly having first and second coil means each symmetrically disposed on a shaft with said coil means embracing respectively a first pair of first and second cylindrical cores, and a second similar pair of third and fourth cylindrical cores; which comprises, mounting said cores in axially spaced relationship on a common axis, forming a passage in each of said cores extending diametrically therethrough, the passages in each of said pairs of cores being spaced angularly about said axis, mounting the coil means of said coil assembly on a common shaft in positions such that leading sides of said first and second coil means simultaneously enter the passages of said first and third cores in response to axial movement of said coil assembly relative to said cores, positioning said shaft on said axis with the leading side of said second coil means adjacent the passage of said first core, moving said coil assembly axially relative to said cores until the leading side of said second coil means is intermediate said first and second annular cores, rotating said coil assembly about said axis to bring the leading side of said second coil means adjacent the passage of said second core, moving said coil assembly axially relative to said cores until said second coil means is positioned to embrace said first pair of cores in response to rotation of said coil assembly, rotating said coil assembly on said axis relative to said cores until the trailing side of said second coil means is adjacent the passage in said first core, moving said coil assembly axially relative to said cores until the trailing side of said second coil means is intermediate said first and second annular cores, rotating said coil assembly on said axis relative to said cores until the trailing side of said second coil means is adjacent the passage in said second core, moving said coil assembly axially relative to said cores until said second coil means is intermediate said pairs of cores, positioning said shaft on said axis with the leading side of said second coil means adjacent the passage in said third core, axially moving, rotating, and again axially moving said coil assembly until said second coil means is positioned to embrace said second pair of cores in the same manner employed for advancing said second coil means from a position external to said cores to a position for embracing said first pair of cores, and mounting said coil assembly for rotation relative to said cores, whereby said first and second coil means embrace respectively said first and second pairs of cores.

35. In an electrical instrument, a magnetic structure, a ring-shaped winding surrounding said structure, and means for insulating said winding, said means comprising a pair of tubular legs embracing parts of said winding, spaced webs extending between said legs to form an insulating unit substantially embracing said magnetic structure, each of said legs intermediate said webs being divided into two portions having a telescoping relationship, said legs having continuous openings therethrough permitting threading of a conductor through said legs and over said webs to form said ring-shaped winding surrounding said magnetic structure and insulated therefrom, and flanges extending from each of said webs adjacent parts of said winding to form with the associated web a channel, each of the channels and the associated portions of said legs forming an integral, unitary U-shaped part wherein one leg portion has a male lip and the remaining leg portion has a female seat for establishing said telescoping relationships.

36. An integral, unitary, U-shaped insulating unit, comprising a web having spaced legs projecting therefrom, one of said legs having its free end forming a male lip and the other of said legs having its free end forming a female lip proportioned to receive in telescoping relationship a lip equal in dimensions to said male lip, said unit being so proportioned that two similar units may be associated with their legs in telescoping relationships to provide a ring-shaped insulating structure, said legs having continuous openings therethrough to permit threading a conductor through the legs and around the webs of an insulating structure constructed from two of the units.

37. In an electrical instrument, a magnetic structure, a coil unit having two substantially parallel coil sides, and bearing mechanism mounting the coil unit for rotation about an axis intermediate and substantially parallel to said coil sides, the magnetic structure comprising a first inner pole piece and a first outer pole piece spaced to define an arcuate air gap for a first one of said coil sides, a second inner pole piece and a second outer pole piece spaced to define an arcuate air gap for a second one of said coil sides, said inner pole pieces being located on opposite sides of the axis and spaced by a distance sufficient to permit movement of the coil unit from a position external to the magnetic structure substantially in a linear direction through the passage between the inner pole pieces to a position wherein the two coil sides may be rotated into their respective air gaps, and a separate winding surrounding one of the pole pieces for each of the air gaps for independently directing, when independently energized, magnetic flux through the associated air gap.

38. An instrument as defined in claim 37 wherein the coil unit comprises a pair of coils mounted on opposite sides of said axis, each of the coils providing one of said two coil sides.

39. In an electrical instrument, a magnetic structure, a coil unit having two substantially parallel coil sides, and bearing mechanism mounting the coil unit for rotation relative to the magnetic structure about an axis intermediate and substantially parallel to said coil sides, the magnetic structure comprising a first inner pole piece and a first outer pole piece respectively having pole faces concentric about said axis and spaced to define an arcuate air gap for a first one of said coil sides, a second inner pole piece and a second outer pole piece respectively having pole faces concentric about said axis and spaced to define an arcuate air gap for a second one of said coil sides, said inner pole pieces being located on opposite sides of the axis and spaced by a distance sufficient to permit movement of the coil unit from a position external to the magnetic structure through the passage between the inner pole pieces to a position wherein the two coil sides may be rotated into their respective air gaps, said coil unit comprising a pair of coils each providing a separate one of said coil sides, the coil sides being equidistant from any point on the axis.

40. In an electrical instrument, a magnetic structure, a coil unit having two substantially parallel coil sides, and bearing mechanism mounting the coil unit for rotation relative to the magnetic structure about an axis intermediate and substantially parallel to said coil sides, the magnetic structure comprising a first inner pole piece and a first outer pole piece spaced to define an arcuate air gap for a first one of said coil sides, a second inner pole piece and a second outer pole piece spaced to define an arcuate air gap for a second one of said coil sides, and a magnetic body substantially surrounding and magnetically connected to the pole pieces, and field-producing-means substantially surrounded by the magnetic body for directing magnetic flux through said air gaps, the pole pieces and the magnetic body, said inner pole pieces being located on opposite sides of the axis and spaced by a distance sufficient to permit movement of the coil unit from a position external to the magnetic structure through the passage between the inner pole pieces to a position wherein the two coil sides may be rotated into their respective air gaps.

41. An instrument as claimed in claim 40, wherein said field-producing-means comprises a winding surrounding one of the first pole pieces, and a winding surrounding one of the second pole pieces.

42. In an electrical instrument, a magnetic structure, a coil unit having two substantially parallel coil sides, and bearing mechanism mounting the coil unit for rotation relative to the magnetic structure about an axis intermediate and substantially parallel to said coil sides, the magnetic structure comprising a first inner pole piece and a first outer pole piece spaced to define an arcuate air gap for a first one of said coil sides, a second inner pole piece and a second outer pole piece spaced to define an arcuate air gap for a second one of said coil sides, said inner pole pieces being located on opposite sides of the axis and spaced by a distance sufficient to permit movement of the coil unit from a position external to the magnetic structure substantially in a predetermined direction through the passage between the inner pole pieces to a position wherein the two coil sides may be rotated into their respective air gaps, the coil unit including a plurality of convoluted flexible conductor strips electrically connected to the coil sides for directing current therethrough, all of the conductor strips of the coil unit being spaced from the coil sides in said predetermined direction, and means securing the coil unit detachably to the magnetic structure, said last-named means when detached permitting said movement in a predetermined direction of the coil unit.

43. In an electrical instrument, a magnetic structure, a coil unit having two substantially parallel coil sides, and bearing mechanism mounting the coil unit for rotation relative to the magnetic structure about an axis intermediate and substantially parallel to said coil sides, the magnetic structure comprising a first inner pole piece and a first outer pole piece spaced to define an arcuate air gap for a first one of said coil sides, a second inner pole piece and a second outer pole piece spaced to define an arcuate air gap for a second one of said coil sides, said inner pole pieces being located on opposite sides of the axis and spaced by a distance sufficient to permit movement of the coil unit from a position external to the magnetic structure substantially in a predetermined direction through the passage between the inner pole pieces to a position wherein the two coil sides may be rotated into their respective air gaps, the coil unit including a control spring, said control spring being displaced from the coil sides in said predetermined direction.

44. In an electrical instrument, a magnetic structure, a coil unit having two substantially parallel coil sides, and bearing mechanism mounting the coil unit for rotation relative to the magnetic structure about an axis intermediate and substantially parallel to said coil sides, the magnetic structure comprising a first inner pole piece and a first outer pole piece spaced to define an arcuate air gap for a first one of said coil sides, a second inner pole piece and a second outer pole piece spaced to define an arcuate air gap for a second one of said coil sides, said inner pole pieces being located on opposite sides of the axis and spaced by a distance sufficient to permit movement of the coil unit from a position external to the magnetic structure substantially in a predetermined direction through the passage between the inner pole pieces to a position wherein the two coil sides may be rotated into their respective air gaps, the coil unit including a plurality of convoluted flexible conductor strips electrically connected to the coil sides for directing current therethrough and constituting all of the terminals for the coil sides, a control spring, and an arm mounted for movement with the coil sides about said axis, said conductor strips, control spring and arm being spaced from the coil sides in said predetermined direction, and means securing the coil unit detachably to the magnetic structure, said last-named means when detached permitting said movement in a predetermined direction of the coil unit.

45. In an electrical instrument, a magnetic structure, coil means, and means mounting the coil means for rotation about an axis relative to the magnetic structure, said coil means having two coil sides spaced angularly about a common portion of the axis and extending substantially parallel to the axis, said magnetic structure having solenoid parts extending between the coil sides and having parts externally of the coil means to provide a separate arcuate airgap for each of said coil sides, and said magnetic structure being configured to provide a passage through which said coil means may be withdrawn from operative position relative to the magnetic structure to a position external to said magnetic structure, said magnetic structure including magnetic-flux-producing means clear of said passage for directing magnetic flux through the airgaps, said coil means in response to current passing therethrough magnetically energizing the magnetic structure to develop therewith independently of said airgap magnetic flux a solenoid force urging the coil means in a predetermined direction about the axis thereof relative to the magnetic structure, and a compensator clear of said passage and disposed for energization in accordance with said current for substantially neutralizing said solenoid force.

46. An instrument in claim 39 wherein the coil unit in response to current passing therethrough magnetically energizes the magnetic structure to develop therewith a solenoid force urging the coil unit in a predetermined direction about said axis relative to the magnetic structure, in combination with a compensator clear of the passage and disposed for energization in accordance with said current for substantially neutralizing the solenoid force, and means for establishing magnetic fields in the airgap.

47. An instrument as claimed in claim 7 wherein the magnetic structure has a passage therein through which the coil means may be moved from operative position relative to the magnetic structure to a position completely removed from the magnetic structure without disturbing the magnetic structure.

LAWRENCE J. LUNAS.

REFERENCES CITED

The following references are of record in the file of this patent:

UNITED STATES PATENTS

| Number | Name | Date |
|---|---|---|
| 678,707 | Weston | July 16, 1901 |
| 819,071 | Roche et al. | May 1, 1906 |
| 1,419,099 | Axen | June 6, 1922 |
| 1,597,327 | Obermaier | Aug. 24, 1926 |
| 1,646,634 | Sutherland | Oct. 25, 1927 |
| 1,659,549 | Kinnard et al. | Feb. 14, 1928 |
| 1,677,378 | Albrecht | July 17, 1928 |
| 1,929,292 | St. Clair | Oct. 3, 1933 |
| 2,033,633 | Hawksley | Mar. 10, 1936 |
| 2,110,680 | Rowell | Mar. 8, 1938 |
| 2,313,352 | Midworth | Mar. 9, 1943 |
| 2,327,114 | Lingel | Aug. 17, 1943 |
| 2,389,393 | Thomander | Nov. 20, 1945 |

FOREIGN PATENTS

| Number | Country | Date |
|---|---|---|
| 13,707 | Great Britain | June 8, 1911 |